United States Patent
Ellis et al.

(10) Patent No.: US 8,806,536 B2
(45) Date of Patent: Aug. 12, 2014

(54) PROGRAM GUIDE SYSTEM WITH PREFERENCE PROFILES

(75) Inventors: Michael D. Ellis, Boulder, CO (US);
Edward B. Knudson, Littleton, CO (US); Thomas R. Lemmons, Sand Springs, OK (US); Joel G. Hassell, Arvada, CO (US); Robert A. Knee, Lansdale, PA (US); Kevin B. Easterbrook, Monument, CO (US)

(73) Assignee: United Video Properties, Inc., Tulsa, OK (US)

( * ) Notice: Subject to any disclaimer, the term of this patent is extended or adjusted under 35 U.S.C. 154(b) by 0 days.

(21) Appl. No.: 13/604,447

(22) Filed: Sep. 5, 2012

(65) Prior Publication Data
US 2013/0007808 A1    Jan. 3, 2013

Related U.S. Application Data

(63) Continuation of application No. 11/894,609, filed on Aug. 20, 2007, which is a continuation of application No. 11/704,736, filed on Feb. 9, 2007, now abandoned, which is a continuation of application No. 09/034,934, filed on Mar. 4, 1998, now Pat. No. 7,185,355.

(51) Int. Cl.
*H04N 21/482* (2011.01)
*H04N 5/445* (2011.01)

(52) U.S. Cl.
USPC ................................ 725/46; 725/40; 725/47

(58) Field of Classification Search
CPC ............ H04N 21/482; H04N 21/4532; H04N 21/4312
USPC ................................... 725/37–40, 44–47, 53
See application file for complete search history.

(56) References Cited

U.S. PATENT DOCUMENTS

| | | | |
|---|---|---|---|
| 3,440,427 A | 4/1969 | Kammer | |
| 3,492,577 A | 1/1970 | Reiter et al. | |

(Continued)

FOREIGN PATENT DOCUMENTS

| | | |
|---|---|---|
| AU | 731010 | 7/1998 |
| AU | 5619898 | 7/1998 |

(Continued)

OTHER PUBLICATIONS

U.S. Appl. No. 60/061,119, Oct. 6, 1997, Ward et al.

(Continued)

*Primary Examiner* — Benjamin R Bruckart
*Assistant Examiner* — Jason Thomas
(74) *Attorney, Agent, or Firm* — Robes & Gray LLP

(57) ABSTRACT

An interactive television program guide system is provided in which a user may inform a program guide of the user's interests. Information on the user's interests may be stored in a preference profile. There may be more than one preference profile, each for a different user. Each preference profile contains a number of preference attributes (program titles, genres, viewing times, channels, broadcast characteristics, etc.). A preference level (e.g., strong or weak like, strong or weak dislike, illegal, mandatory, don't care, etc.) that is indicative of the user's level of interest is associated with each preference attribute. Preference profiles may be used to restrict the programs that are listed in various program listings display screens and may be used to limit the channels to which the program guide allows the user to tune.

20 Claims, 33 Drawing Sheets

(56) References Cited

U.S. PATENT DOCUMENTS

| | | |
|---|---|---|
| 3,493,674 A | 2/1970 | Houghton |
| 3,729,581 A | 4/1973 | Anderson |
| 3,833,757 A | 9/1974 | Kirk, Jr. et al. |
| 3,891,792 A | 6/1975 | Kimura |
| 3,936,868 A | 2/1976 | Thorpe |
| 3,996,583 A | 12/1976 | Hutt et al. |
| 4,004,085 A | 1/1977 | Makino et al. |
| 4,016,361 A | 4/1977 | Pandey |
| 4,024,401 A | 5/1977 | Bernstein et al. |
| 4,026,555 A | 5/1977 | Kirschner et al. |
| 4,031,548 A | 6/1977 | Kato et al. |
| 4,052,719 A | 10/1977 | Hutt et al. |
| 4,058,830 A | 11/1977 | Guinet et al. |
| 4,079,419 A | 3/1978 | Siegle et al. |
| 4,081,753 A | 3/1978 | Miller |
| 4,081,754 A | 3/1978 | Jackson |
| 4,096,524 A | 6/1978 | Scott |
| 4,134,127 A | 1/1979 | Campioni |
| 4,139,860 A | 2/1979 | Micic et al. |
| 4,150,254 A | 4/1979 | Schussler et al. |
| 4,156,850 A | 5/1979 | Beyers, Jr. |
| 4,161,728 A | 7/1979 | Insam |
| 4,162,513 A | 7/1979 | Beyers, Jr. et al. |
| 4,170,782 A | 10/1979 | Miller |
| 4,186,413 A | 1/1980 | Mortimer |
| 4,203,130 A | 5/1980 | Doumit et al. |
| 4,205,343 A | 5/1980 | Barrett |
| 4,218,698 A | 8/1980 | Bart et al. |
| 4,228,543 A | 10/1980 | Jackson |
| 4,231,031 A | 10/1980 | Crowther et al. |
| 4,233,628 A | 11/1980 | Ciciora |
| 4,249,211 A | 2/1981 | Baba et al. |
| 4,249,213 A | 2/1981 | Imaide et al. |
| 4,261,006 A | 4/1981 | Weintraub et al. |
| 4,264,924 A | 4/1981 | Freeman |
| 4,264,925 A | 4/1981 | Freeman et al. |
| 4,270,145 A | 5/1981 | Farina |
| 4,271,532 A | 6/1981 | Wine |
| 4,276,597 A | 6/1981 | Dissly et al. |
| 4,280,148 A | 7/1981 | Saxena |
| 4,283,787 A | 8/1981 | Chambers |
| 4,288,809 A | 9/1981 | Yabe |
| 4,290,142 A | 9/1981 | Schnee et al. |
| 4,305,101 A | 12/1981 | Yarbrough et al. |
| 4,329,684 A | 5/1982 | Monteath et al. |
| 4,331,974 A | 5/1982 | Cogswell et al. |
| 4,337,480 A | 6/1982 | Bourassin et al. |
| 4,337,483 A | 6/1982 | Guillou |
| 4,344,090 A | 8/1982 | Belisomi et al. |
| 4,355,415 A | 10/1982 | George et al. |
| 4,367,557 A | 1/1983 | Stern et al. |
| 4,367,559 A | 1/1983 | Tults |
| 4,375,651 A | 3/1983 | Templin et al. |
| 4,381,522 A | 4/1983 | Lambert |
| 4,388,645 A | 6/1983 | Cox et al. |
| 4,390,901 A | 6/1983 | Keiser |
| 4,393,376 A | 7/1983 | Thomas |
| 4,405,946 A | 9/1983 | Knight |
| 4,412,244 A | 10/1983 | Shanley, II |
| 4,413,281 A | 11/1983 | Thonnart |
| 4,420,769 A | 12/1983 | Novak |
| 4,425,579 A | 1/1984 | Merrell |
| 4,425,581 A | 1/1984 | Schweppe et al. |
| 4,429,385 A | 1/1984 | Cichelli et al. |
| 4,439,784 A | 3/1984 | Furukawa et al. |
| 4,449,249 A | 5/1984 | Price |
| 4,456,925 A | 6/1984 | Skerlos et al. |
| 4,466,017 A | 8/1984 | Banker |
| 4,477,830 A | 10/1984 | Lindman et al. |
| 4,488,179 A | 12/1984 | Kruger et al. |
| 4,495,654 A | 1/1985 | Deiss |
| 4,496,171 A | 1/1985 | Cherry |
| 4,496,976 A | 1/1985 | Swanson et al. |
| 4,510,623 A | 4/1985 | Bonneau et al. |
| 4,520,404 A | 5/1985 | Von Kohorn |
| 4,523,228 A | 6/1985 | Banker |
| 4,527,194 A | 7/1985 | Sirazi |
| 4,531,020 A | 7/1985 | Wechselberger et al. |
| 4,533,910 A | 8/1985 | Sukonick et al. |
| 4,536,791 A | 8/1985 | Campbell et al. |
| 4,547,804 A | 10/1985 | Greenberg |
| 4,554,584 A | 11/1985 | Elam et al. |
| 4,555,775 A | 11/1985 | Pike |
| 4,566,034 A | 1/1986 | Harger et al. |
| 4,573,072 A | 2/1986 | Freeman |
| 4,587,520 A | 5/1986 | Astle |
| 4,595,951 A | 6/1986 | Filliman |
| 4,595,952 A | 6/1986 | Filliman |
| 4,598,288 A | 7/1986 | Yarbrough et al. |
| 4,602,279 A | 7/1986 | Freeman |
| 4,605,964 A | 8/1986 | Chard |
| 4,605,973 A | 8/1986 | Von Kohorn |
| 4,620,229 A | 10/1986 | Amano et al. |
| 4,622,545 A | 11/1986 | Atkinson |
| 4,635,109 A | 1/1987 | Comeau |
| 4,635,121 A | 1/1987 | Hoffmann |
| 4,641,205 A | 2/1987 | Beyers, Jr. |
| 4,677,466 A | 6/1987 | Lert, Jr. et al. |
| 4,685,131 A | 8/1987 | Horne |
| 4,689,022 A | 8/1987 | Peers et al. |
| 4,691,351 A | 9/1987 | Hayashi et al. |
| 4,694,490 A | 9/1987 | Harvey et al. |
| 4,701,794 A | 10/1987 | Froling et al. |
| 4,704,725 A | 11/1987 | Harvey et al. |
| 4,706,121 A | 11/1987 | Young |
| 4,712,105 A | 12/1987 | Kohler |
| 4,714,919 A | 12/1987 | Foster |
| 4,718,107 A | 1/1988 | Hayes |
| RE32,632 E | 3/1988 | Atkinson |
| 4,745,549 A | 5/1988 | Hashimoto |
| 4,748,618 A | 5/1988 | Brown et al. |
| 4,750,036 A | 6/1988 | Martinez |
| 4,750,213 A | 6/1988 | Novak |
| 4,751,578 A | 6/1988 | Reiter et al. |
| 4,754,326 A | 6/1988 | Kram et al. |
| 4,768,228 A | 8/1988 | Clupper et al. |
| 4,772,882 A | 9/1988 | Mical |
| 4,775,935 A | 10/1988 | Yourick |
| 4,785,408 A | 11/1988 | Britton et al. |
| 4,787,063 A | 11/1988 | Muguet |
| 4,812,834 A | 3/1989 | Wells |
| 4,814,883 A | 3/1989 | Perine et al. |
| 4,821,102 A | 4/1989 | Ichikawa et al. |
| 4,821,211 A | 4/1989 | Torres |
| 4,829,558 A | 5/1989 | Welsh |
| 4,847,604 A | 7/1989 | Doyle |
| 4,847,698 A | 7/1989 | Freeman |
| 4,847,700 A | 7/1989 | Freeman |
| 4,857,999 A | 8/1989 | Welsh |
| 4,862,268 A | 8/1989 | Campbell et al. |
| 4,864,429 A | 9/1989 | Eigeldinger et al. |
| 4,873,623 A | 10/1989 | Lane et al. |
| 4,882,732 A | 11/1989 | Kaminaga |
| 4,884,223 A | 11/1989 | Ingle et al. |
| 4,888,796 A | 12/1989 | Olivo, Jr. |
| 4,890,320 A | 12/1989 | Monslow et al. |
| 4,890,321 A | 12/1989 | Seth-Smith et al. |
| 4,894,789 A | 1/1990 | Yee |
| 4,899,136 A | 2/1990 | Beard et al. |
| 4,899,139 A | 2/1990 | Ishimochi et al. |
| 4,905,094 A | 2/1990 | Pocock et al. |
| 4,908,707 A | 3/1990 | Kinghorn |
| 4,908,713 A | 3/1990 | Levine |
| 4,908,859 A | 3/1990 | Bennett et al. |
| 4,914,517 A | 4/1990 | Duffield |
| 4,914,732 A | 4/1990 | Henderson et al. |
| 4,930,158 A | 5/1990 | Vogel |
| 4,930,160 A | 5/1990 | Vogel |
| 4,931,783 A | 6/1990 | Atkinson |
| 4,935,865 A | 6/1990 | Rowe et al. |
| 4,937,821 A | 6/1990 | Boulton |
| 4,937,863 A | 6/1990 | Robert et al. |
| 4,939,507 A | 7/1990 | Beard et al. |
| 4,942,391 A | 7/1990 | Kikuta et al. |

(56) References Cited

U.S. PATENT DOCUMENTS

| | | |
|---|---|---|
| 4,945,563 A | 7/1990 | Horton et al. |
| 4,959,719 A | 9/1990 | Strubbe et al. |
| 4,959,720 A | 9/1990 | Duffield et al. |
| 4,963,994 A | 10/1990 | Levine |
| 4,977,455 A | 12/1990 | Young |
| 4,987,486 A | 1/1991 | Johnson et al. |
| 4,991,011 A | 2/1991 | Johnson et al. |
| 4,991,012 A | 2/1991 | Yoshino |
| 4,992,940 A | 2/1991 | Dworkin |
| 4,995,078 A | 2/1991 | Monslow et al. |
| 4,996,642 A | 2/1991 | Hey |
| 4,998,171 A | 3/1991 | Kim et al. |
| 5,003,384 A | 3/1991 | Durden et al. |
| 5,008,853 A | 4/1991 | Bly et al. |
| 5,014,125 A | 5/1991 | Pocock et al. |
| 5,027,400 A | 6/1991 | Baji et al. |
| 5,036,314 A | 7/1991 | Barillari et al. |
| 5,038,211 A | 8/1991 | Hallenbeck |
| 5,045,947 A | 9/1991 | Beery |
| 5,047,867 A | 9/1991 | Strubbe et al. |
| 5,058,160 A | 10/1991 | Banker et al. |
| 5,062,060 A | 10/1991 | Kolnick |
| 5,068,733 A | 11/1991 | Bennett |
| 5,068,734 A | 11/1991 | Beery |
| 5,072,412 A | 12/1991 | Henderson, Jr. et al. |
| 5,075,771 A | 12/1991 | Hashimoto |
| 5,083,800 A | 1/1992 | Lockton |
| 5,091,785 A | 2/1992 | Canfield et al. |
| 5,093,921 A | 3/1992 | Bevins, Jr. |
| 5,099,319 A | 3/1992 | Esch et al. |
| 5,103,314 A | 4/1992 | Keenan |
| 5,105,184 A | 4/1992 | Pirani et al. |
| 5,109,279 A | 4/1992 | Ando |
| 5,119,188 A | 6/1992 | McCalley et al. |
| 5,121,476 A | 6/1992 | Yee |
| 5,123,046 A | 6/1992 | Levine |
| 5,126,851 A | 6/1992 | Yoshimura |
| 5,148,154 A | 9/1992 | Mackay et al. |
| 5,151,782 A | 9/1992 | Ferraro |
| 5,151,789 A | 9/1992 | Young |
| 5,155,591 A | 10/1992 | Wachob |
| 5,155,806 A | 10/1992 | Hoeber et al. |
| 5,157,768 A | 10/1992 | Hoeber et al. |
| 5,161,023 A | 11/1992 | Keenan |
| 5,162,905 A | 11/1992 | Itoh et al. |
| 5,170,388 A | 12/1992 | Endoh |
| 5,172,111 A | 12/1992 | Olivo, Jr. |
| 5,172,413 A | 12/1992 | Bradley et al. |
| 5,177,604 A | 1/1993 | Martinez |
| 5,179,439 A | 1/1993 | Hashimoto et al. |
| 5,179,654 A | 1/1993 | Richards et al. |
| 5,187,589 A | 2/1993 | Kono |
| 5,189,630 A | 2/1993 | Barstow et al. |
| 5,191,423 A | 3/1993 | Yoshida et al. |
| 5,195,092 A | 3/1993 | Wilson et al. |
| 5,195,134 A | 3/1993 | Inoue et al. |
| 5,200,822 A | 4/1993 | Bronfin et al. |
| 5,200,823 A | 4/1993 | Yoneda et al. |
| 5,204,897 A | 4/1993 | Wyman |
| 5,206,722 A | 4/1993 | Kwan |
| 5,210,611 A | 5/1993 | Yee et al. |
| 5,212,553 A | 5/1993 | Maruoka |
| 5,214,622 A | 5/1993 | Nemoto et al. |
| 5,216,515 A | 6/1993 | Steele et al. |
| 5,220,420 A | 6/1993 | Hoarty et al. |
| 5,223,924 A | 6/1993 | Strubbe |
| 5,227,874 A | 7/1993 | Von Kohorn |
| 5,231,493 A | 7/1993 | Apitz |
| 5,231,494 A | 7/1993 | Wachob |
| RE34,340 E | 8/1993 | Freeman |
| 5,233,423 A | 8/1993 | Jernigan et al. |
| 5,233,654 A | 8/1993 | Harvey et al. |
| 5,235,415 A | 8/1993 | Bonicel et al. |
| 5,236,199 A | 8/1993 | Thompson, Jr. |
| 5,237,411 A | 8/1993 | Fink et al. |
| 5,237,417 A | 8/1993 | Hayashi et al. |
| 5,237,418 A | 8/1993 | Kaneko |
| 5,239,540 A | 8/1993 | Rovira et al. |
| 5,241,428 A | 8/1993 | Goldwasser et al. |
| 5,245,420 A | 9/1993 | Harney et al. |
| 5,247,347 A | 9/1993 | Litteral et al. |
| 5,247,364 A | 9/1993 | Banker et al. |
| 5,247,580 A | 9/1993 | Kimura et al. |
| 5,253,066 A | 10/1993 | Vogel |
| 5,253,067 A | 10/1993 | Chaney et al. |
| 5,260,778 A | 11/1993 | Kauffman et al. |
| 5,260,788 A | 11/1993 | Takano et al. |
| 5,260,999 A | 11/1993 | Wyman |
| 5,262,860 A | 11/1993 | Fitzpatrick et al. |
| 5,283,639 A | 2/1994 | Esch et al. |
| 5,283,819 A | 2/1994 | Glick et al. |
| 5,285,278 A | 2/1994 | Holman |
| 5,285,284 A | 2/1994 | Takashima et al. |
| 5,296,931 A | 3/1994 | Na |
| 5,301,028 A | 4/1994 | Banker et al. |
| 5,307,173 A | 4/1994 | Yuen et al. |
| 5,311,423 A | 5/1994 | Clark |
| 5,313,282 A | 5/1994 | Hayashi |
| 5,317,403 A | 5/1994 | Keenan |
| 5,319,445 A | 6/1994 | Fitts |
| 5,323,234 A | 6/1994 | Kawasaki |
| 5,323,240 A | 6/1994 | Amano et al. |
| 5,325,183 A | 6/1994 | Rhee |
| 5,325,423 A | 6/1994 | Lewis |
| 5,335,277 A | 8/1994 | Harvey et al. |
| 5,343,239 A | 8/1994 | Lappington et al. |
| 5,345,430 A | 9/1994 | Moe |
| 5,347,167 A | 9/1994 | Singh |
| 5,347,632 A | 9/1994 | Filepp et al. |
| 5,351,075 A | 9/1994 | Herz et al. |
| 5,353,121 A | 10/1994 | Young et al. |
| 5,357,276 A | 10/1994 | Banker et al. |
| 5,359,367 A | 10/1994 | Stockill |
| 5,359,601 A | 10/1994 | Wasilewski et al. |
| 5,365,282 A | 11/1994 | Levine |
| 5,367,316 A | 11/1994 | Ikezaki |
| 5,367,330 A | 11/1994 | Haave et al. |
| 5,371,551 A | 12/1994 | Logan et al. |
| 5,373,288 A | 12/1994 | Blahut |
| 5,374,942 A | 12/1994 | Gilligan et al. |
| 5,374,951 A | 12/1994 | Welsh |
| 5,377,317 A | 12/1994 | Bates et al. |
| 5,377,319 A | 12/1994 | Kitahara et al. |
| 5,382,983 A | 1/1995 | Kwoh et al. |
| 5,384,910 A | 1/1995 | Torres |
| 5,387,945 A | 2/1995 | Takeuchi |
| 5,398,074 A | 3/1995 | Duffield et al. |
| 5,404,393 A | 4/1995 | Remillard |
| 5,410,326 A | 4/1995 | Goldstein |
| 5,410,343 A | 4/1995 | Coddington et al. |
| 5,410,344 A | 4/1995 | Graves et al. |
| 5,410,367 A | 4/1995 | Zahavi et al. |
| 5,412,720 A | 5/1995 | Hoarty |
| 5,416,508 A | 5/1995 | Sakuma et al. |
| 5,424,770 A | 6/1995 | Schmelzer et al. |
| 5,425,101 A | 6/1995 | Woo et al. |
| 5,432,561 A | 7/1995 | Strubbe |
| 5,434,626 A | 7/1995 | Hayashi et al. |
| 5,436,676 A | 7/1995 | Pint et al. |
| 5,438,372 A | 8/1995 | Tsumori et al. |
| 5,440,678 A | 8/1995 | Eisen et al. |
| 5,442,389 A | 8/1995 | Blahut et al. |
| 5,444,499 A | 8/1995 | Saitoh |
| 5,446,919 A | 8/1995 | Wilkins |
| 5,452,012 A | 9/1995 | Saitoh |
| 5,459,522 A | 10/1995 | Pint |
| 5,461,415 A | 10/1995 | Wolf et al. |
| 5,465,113 A | 11/1995 | Gilboy |
| 5,465,385 A | 11/1995 | Ohga et al. |
| 5,469,206 A | 11/1995 | Strubbe et al. |
| 5,477,262 A | 12/1995 | Banker et al. |
| 5,479,266 A | 12/1995 | Young et al. |
| 5,479,268 A | 12/1995 | Young et al. |
| 5,479,497 A | 12/1995 | Kovarik |

(56) References Cited

U.S. PATENT DOCUMENTS

| | | |
|---|---|---|
| 5,481,296 A | 1/1996 | Cragun et al. |
| 5,483,278 A | 1/1996 | Strubbe et al. |
| 5,485,197 A | 1/1996 | Hoarty |
| 5,485,219 A | 1/1996 | Woo |
| 5,485,221 A | 1/1996 | Banker et al. |
| 5,488,409 A | 1/1996 | Yuen et al. |
| 5,495,295 A | 2/1996 | Long |
| 5,502,504 A | 3/1996 | Marshall et al. |
| 5,515,098 A | 5/1996 | Carles |
| 5,515,106 A | 5/1996 | Chaney et al. |
| 5,515,511 A | 5/1996 | Nguyen et al. |
| 5,517,254 A | 5/1996 | Monta et al. |
| 5,517,257 A | 5/1996 | Dunn et al. |
| 5,521,589 A | 5/1996 | Mondrosch et al. |
| 5,523,794 A | 6/1996 | Mankovitz et al. |
| 5,523,796 A | 6/1996 | Marshall et al. |
| 5,524,195 A | 6/1996 | Clanton, III et al. |
| 5,526,034 A | 6/1996 | Hoarty et al. |
| 5,528,304 A | 6/1996 | Cherrick et al. |
| 5,532,735 A | 7/1996 | Blahut et al. |
| 5,532,754 A | 7/1996 | Young et al. |
| 5,534,911 A | 7/1996 | Levitan |
| 5,537,141 A | 7/1996 | Harper et al. |
| 5,539,449 A | 7/1996 | Blahut et al. |
| 5,539,479 A | 7/1996 | Bertram |
| 5,539,822 A | 7/1996 | Lett |
| 5,541,662 A | 7/1996 | Adams et al. |
| 5,541,738 A | 7/1996 | Mankovitz |
| 5,550,576 A | 8/1996 | Klosterman |
| 5,557,338 A | 9/1996 | Maze et al. |
| 5,557,721 A | 9/1996 | Fite et al. |
| 5,559,548 A | 9/1996 | Davis et al. |
| 5,559,549 A | 9/1996 | Hendricks et al. |
| 5,559,550 A | 9/1996 | Mankovitz |
| 5,559,942 A | 9/1996 | Gough et al. |
| 5,561,471 A | 10/1996 | Kim et al. |
| 5,561,709 A | 10/1996 | Remillard |
| 5,563,665 A | 10/1996 | Chang |
| 5,568,272 A | 10/1996 | Levine |
| 5,570,295 A | 10/1996 | Isenberg et al. |
| 5,572,442 A | 11/1996 | Schulhof et al. |
| 5,574,962 A | 11/1996 | Fardeau et al. |
| 5,576,755 A | 11/1996 | Davis et al. |
| 5,576,951 A | 11/1996 | Lockwood |
| 5,579,055 A | 11/1996 | Hamilton et al. |
| 5,581,479 A | 12/1996 | McLaughlin et al. |
| 5,582,364 A | 12/1996 | Trulin et al. |
| 5,583,560 A | 12/1996 | Florin et al. |
| 5,583,561 A | 12/1996 | Baker et al. |
| 5,583,563 A | 12/1996 | Wanderscheid et al. |
| 5,583,653 A | 12/1996 | Timmermans |
| 5,585,838 A | 12/1996 | Lawler et al. |
| 5,585,858 A | 12/1996 | Harper et al. |
| 5,585,865 A | 12/1996 | Amano et al. |
| 5,585,866 A | 12/1996 | Miller et al. |
| 5,589,892 A | 12/1996 | Knee et al. |
| 5,592,551 A | 1/1997 | Lett et al. |
| 5,594,490 A | 1/1997 | Dawson et al. |
| 5,594,509 A | 1/1997 | Florin et al. |
| 5,594,661 A | 1/1997 | Bruner et al. |
| 5,596,373 A | 1/1997 | White et al. |
| 5,600,364 A | 2/1997 | Hendricks et al. |
| 5,600,366 A | 2/1997 | Schulman |
| 5,600,573 A | 2/1997 | Hendricks et al. |
| 5,602,582 A | 2/1997 | Wanderscheid et al. |
| 5,602,596 A | 2/1997 | Claussen et al. |
| 5,602,597 A | 2/1997 | Bertram |
| 5,602,598 A | 2/1997 | Shintani et al. |
| 5,606,374 A | 2/1997 | Bertram |
| 5,610,653 A | 3/1997 | Abecassis |
| 5,617,565 A | 4/1997 | Augenbraum et al. |
| 5,619,247 A | 4/1997 | Russo |
| 5,619,249 A | 4/1997 | Billock et al. |
| 5,619,274 A | 4/1997 | Roop et al. |
| 5,621,456 A | 4/1997 | Florin et al. |
| 5,623,613 A | 4/1997 | Rowe et al. |
| 5,627,940 A | 5/1997 | Rohra et al. |
| 5,629,733 A | 5/1997 | Youman et al. |
| 5,630,119 A | 5/1997 | Aristides et al. |
| 5,631,995 A | 5/1997 | Weissensteiner et al. |
| 5,632,007 A | 5/1997 | Freeman |
| 5,633,683 A | 5/1997 | Rosengren et al. |
| 5,635,978 A | 6/1997 | Alten et al. |
| 5,635,979 A | 6/1997 | Kostreski et al. |
| 5,635,989 A | 6/1997 | Rothmuller |
| 5,636,346 A | 6/1997 | Saxe |
| 5,640,501 A | 6/1997 | Turpin |
| 5,640,577 A | 6/1997 | Scharmer |
| 5,642,153 A | 6/1997 | Chaney et al. |
| 5,648,813 A | 7/1997 | Tanigawa et al. |
| 5,648,824 A | 7/1997 | Dunn et al. |
| 5,650,826 A | 7/1997 | Eitz |
| 5,650,831 A | 7/1997 | Farwell |
| 5,652,613 A | 7/1997 | Lazarus et al. |
| 5,652,615 A | 7/1997 | Bryant et al. |
| 5,654,748 A | 8/1997 | Matthews, III |
| 5,654,886 A | 8/1997 | Zereski, Jr. et al. |
| 5,657,072 A | 8/1997 | Aristides et al. |
| 5,657,091 A | 8/1997 | Bertram |
| 5,657,414 A | 8/1997 | Lett et al. |
| 5,659,350 A | 8/1997 | Hendricks et al. |
| 5,659,366 A | 8/1997 | Kerman |
| 5,659,367 A | 8/1997 | Yuen |
| 5,661,516 A | 8/1997 | Carles |
| 5,661,517 A | 8/1997 | Budow et al. |
| 5,663,757 A | 9/1997 | Morales |
| 5,664,111 A | 9/1997 | Nahan et al. |
| 5,666,293 A | 9/1997 | Metz et al. |
| 5,666,498 A | 9/1997 | Amro |
| 5,666,645 A | 9/1997 | Thomas et al. |
| 5,671,276 A | 9/1997 | Eyer et al. |
| 5,671,411 A | 9/1997 | Watts et al. |
| 5,675,390 A | 10/1997 | Schindler et al. |
| 5,675,752 A | 10/1997 | Scott et al. |
| 5,677,708 A | 10/1997 | Matthews, III et al. |
| 5,677,981 A | 10/1997 | Kato et al. |
| 5,682,195 A | 10/1997 | Hendricks et al. |
| 5,682,206 A | 10/1997 | Wehmeyer et al. |
| 5,684,525 A | 11/1997 | Klosterman |
| 5,686,954 A | 11/1997 | Yoshinobu et al. |
| 5,687,331 A | 11/1997 | Volk et al. |
| 5,689,648 A | 11/1997 | Diaz et al. |
| 5,689,666 A | 11/1997 | Berquist et al. |
| 5,692,214 A | 11/1997 | Levine |
| 5,694,163 A | 12/1997 | Harrison |
| 5,694,176 A | 12/1997 | Bruette et al. |
| 5,694,381 A | 12/1997 | Sako |
| 5,696,905 A | 12/1997 | Reimer et al. |
| 5,699,107 A | 12/1997 | Lawler et al. |
| 5,699,125 A | 12/1997 | Rzeszewski et al. |
| 5,708,478 A | 1/1998 | Tognazzini |
| 5,710,601 A | 1/1998 | Marshall et al. |
| 5,710,815 A | 1/1998 | Ming et al. |
| 5,710,884 A | 1/1998 | Dedrick |
| 5,715,314 A | 2/1998 | Payne et al. |
| 5,715,399 A | 2/1998 | Bezos |
| 5,717,452 A | 2/1998 | Janin et al. |
| 5,717,923 A | 2/1998 | Dedrick |
| 5,721,829 A | 2/1998 | Dunn et al. |
| 5,722,041 A | 2/1998 | Freadman |
| 5,724,091 A | 3/1998 | Freeman et al. |
| 5,724,103 A | 3/1998 | Batchelor |
| 5,724,521 A | 3/1998 | Dedrick |
| 5,724,525 A | 3/1998 | Beyers, II et al. |
| 5,724,567 A | 3/1998 | Rose et al. |
| 5,727,060 A | 3/1998 | Young |
| 5,727,163 A | 3/1998 | Bezos |
| 5,731,844 A | 3/1998 | Rauch et al. |
| 5,732,216 A | 3/1998 | Logan et al. |
| 5,734,444 A | 3/1998 | Yoshinobu |
| 5,734,853 A | 3/1998 | Hendricks et al. |
| 5,734,893 A | 3/1998 | Li et al. |
| 5,737,028 A | 4/1998 | Bertram et al. |
| 5,737,029 A | 4/1998 | Ohkura et al. |

(56) References Cited

U.S. PATENT DOCUMENTS

| | | |
|---|---|---|
| 5,737,030 A | 4/1998 | Hong et al. |
| 5,740,549 A | 4/1998 | Reilly et al. |
| 5,745,710 A | 4/1998 | Clanton, III et al. |
| 5,751,282 A | 5/1998 | Girard et al. |
| 5,752,159 A | 5/1998 | Faust et al. |
| 5,752,160 A | 5/1998 | Dunn |
| 5,754,258 A | 5/1998 | Hanaya et al. |
| 5,754,771 A | 5/1998 | Epperson et al. |
| 5,754,939 A | 5/1998 | Herz et al. |
| 5,757,417 A | 5/1998 | Aras et al. |
| 5,758,257 A | 5/1998 | Herz et al. |
| 5,758,258 A | 5/1998 | Shoff et al. |
| 5,758,259 A | 5/1998 | Lawler |
| 5,760,821 A | 6/1998 | Ellis et al. |
| 5,761,372 A | 6/1998 | Yoshinobu et al. |
| 5,761,601 A | 6/1998 | Nemirofsky et al. |
| 5,761,606 A | 6/1998 | Wolzien |
| 5,768,528 A | 6/1998 | Stumm |
| 5,774,170 A | 6/1998 | Hite et al. |
| 5,774,357 A | 6/1998 | Hoffberg et al. |
| 5,774,534 A | 6/1998 | Mayer |
| 5,774,664 A | 6/1998 | Hidary et al. |
| 5,774,887 A | 6/1998 | Wolff et al. |
| 5,778,181 A | 7/1998 | Hidary et al. |
| 5,778,182 A | 7/1998 | Cathey et al. |
| 5,781,226 A | 7/1998 | Sheehan |
| 5,781,245 A | 7/1998 | Van Der Weij et al. |
| 5,781,246 A | 7/1998 | Alten et al. |
| 5,781,734 A | 7/1998 | Ohno et al. |
| 5,784,258 A | 7/1998 | Quinn |
| 5,790,198 A | 8/1998 | Roop |
| 5,790,201 A | 8/1998 | Antos |
| 5,790,202 A | 8/1998 | Kummer et al. |
| 5,790,426 A | 8/1998 | Robinson |
| 5,790,753 A | 8/1998 | Krishnamoorthy et al. |
| 5,793,438 A | 8/1998 | Bedard |
| 5,793,964 A | 8/1998 | Rogers et al. |
| 5,793,972 A | 8/1998 | Shane |
| 5,796,952 A | 8/1998 | Davis et al. |
| 5,798,785 A | 8/1998 | Hendricks et al. |
| 5,801,747 A | 9/1998 | Bedard |
| 5,801,785 A | 9/1998 | Crump et al. |
| 5,801,787 A | 9/1998 | Schein et al. |
| 5,802,284 A | 9/1998 | Karlton et al. |
| 5,805,154 A | 9/1998 | Brown |
| 5,805,155 A | 9/1998 | Allibhoy et al. |
| 5,805,167 A | 9/1998 | van Cruyningen |
| 5,805,235 A | 9/1998 | Bedard |
| 5,805,763 A * | 9/1998 | Lawler et al. ............... 386/296 |
| 5,805,804 A | 9/1998 | Laursen et al. |
| 5,808,608 A | 9/1998 | Young et al. |
| 5,808,694 A | 9/1998 | Usui et al. |
| 5,809,204 A | 9/1998 | Young et al. |
| 5,812,123 A | 9/1998 | Rowe et al. |
| 5,812,124 A | 9/1998 | Eick et al. |
| 5,812,205 A | 9/1998 | Milnes et al. |
| 5,812,937 A | 9/1998 | Takashima et al. |
| 5,815,145 A | 9/1998 | Matthews, III |
| 5,815,671 A | 9/1998 | Morrison |
| 5,818,438 A | 10/1998 | Howe et al. |
| 5,818,439 A | 10/1998 | Nagasaka et al. |
| 5,818,441 A | 10/1998 | Throckmorton et al. |
| 5,818,511 A | 10/1998 | Farry et al. |
| 5,818,541 A | 10/1998 | Matsuura et al. |
| 5,818,935 A | 10/1998 | Maa |
| 5,819,019 A | 10/1998 | Nelson |
| 5,819,156 A | 10/1998 | Belmont |
| 5,819,284 A | 10/1998 | Farber et al. |
| 5,822,123 A | 10/1998 | Davis et al. |
| 5,825,407 A | 10/1998 | Cowe et al. |
| 5,828,402 A | 10/1998 | Collings |
| 5,828,420 A | 10/1998 | Marshall et al. |
| 5,828,839 A | 10/1998 | Moncreiff |
| 5,828,945 A | 10/1998 | Klosterman |
| 5,830,068 A | 11/1998 | Brenner et al. |
| 5,832,223 A | 11/1998 | Hara et al. |
| 5,833,468 A | 11/1998 | Guy et al. |
| 5,835,717 A | 11/1998 | Karlton et al. |
| 5,838,314 A | 11/1998 | Neel et al. |
| 5,838,383 A | 11/1998 | Chimoto et al. |
| 5,838,419 A | 11/1998 | Holland et al. |
| 5,842,010 A | 11/1998 | Jain et al. |
| 5,842,199 A | 11/1998 | Miller et al. |
| 5,844,620 A | 12/1998 | Coleman et al. |
| 5,848,352 A | 12/1998 | Dougherty et al. |
| 5,848,396 A | 12/1998 | Gerace |
| 5,848,397 A | 12/1998 | Marsh et al. |
| 5,850,218 A | 12/1998 | LaJoie et al. |
| 5,852,437 A | 12/1998 | Wugofski et al. |
| 5,861,881 A | 1/1999 | Freeman et al. |
| 5,861,906 A | 1/1999 | Dunn et al. |
| 5,862,292 A | 1/1999 | Kubota et al. |
| 5,867,226 A | 2/1999 | Wehmeyer |
| 5,867,227 A | 2/1999 | Yamaguchi |
| 5,867,228 A | 2/1999 | Miki et al. |
| 5,872,588 A | 2/1999 | Aras et al. |
| 5,873,660 A | 2/1999 | Walsh et al. |
| 5,874,985 A | 2/1999 | Matthews, III |
| 5,875,108 A | 2/1999 | Hoffberg et al. |
| 5,877,906 A | 3/1999 | Nagasawa et al. |
| 5,880,768 A | 3/1999 | Lemmons et al. |
| 5,883,677 A | 3/1999 | Hofmann |
| 5,886,691 A | 3/1999 | Furuya et al. |
| 5,886,731 A | 3/1999 | Ebisawa |
| 5,889,950 A | 3/1999 | Kuzma |
| 5,892,498 A | 4/1999 | Marshall et al. |
| 5,892,535 A | 4/1999 | Allen et al. |
| 5,892,767 A | 4/1999 | Bell et al. |
| 5,900,867 A | 5/1999 | Schindler et al. |
| 5,900,905 A | 5/1999 | Shoff et al. |
| 5,903,314 A | 5/1999 | Niijima et al. |
| 5,903,545 A | 5/1999 | Sabourin et al. |
| 5,903,816 A | 5/1999 | Broadwin et al. |
| 5,905,497 A | 5/1999 | Vaughan et al. |
| 5,907,322 A | 5/1999 | Kelly et al. |
| 5,907,323 A | 5/1999 | Lawler et al. |
| 5,907,366 A | 5/1999 | Farmer et al. |
| 5,912,664 A | 6/1999 | Eick et al. |
| 5,914,712 A | 6/1999 | Sartain et al. |
| 5,914,746 A | 6/1999 | Matthews, III et al. |
| 5,917,481 A | 6/1999 | Rzeszewski et al. |
| 5,917,830 A | 6/1999 | Chen et al. |
| 5,918,014 A | 6/1999 | Robinson |
| 5,920,700 A | 7/1999 | Gordon et al. |
| 5,923,848 A | 7/1999 | Goodhand et al. |
| 5,929,849 A | 7/1999 | Kikinis |
| 5,929,850 A | 7/1999 | Broadwin et al. |
| 5,929,932 A | 7/1999 | Otsuki et al. |
| 5,931,905 A | 8/1999 | Hashimoto et al. |
| 5,936,679 A | 8/1999 | Kasahara et al. |
| 5,937,160 A | 8/1999 | Davis et al. |
| 5,940,073 A | 8/1999 | Klosterman et al. |
| 5,940,572 A | 8/1999 | Balaban et al. |
| 5,945,988 A | 8/1999 | Williams et al. |
| 5,946,386 A | 8/1999 | Rogers et al. |
| 5,946,678 A | 8/1999 | Aalbersberg |
| 5,949,954 A | 9/1999 | Young et al. |
| 5,951,642 A | 9/1999 | Onoe et al. |
| 5,955,988 A | 9/1999 | Blonstein et al. |
| 5,959,592 A | 9/1999 | Petruzelli |
| 5,959,688 A | 9/1999 | Schein et al. |
| 5,960,411 A | 9/1999 | Hartman et al. |
| 5,963,264 A | 10/1999 | Jackson |
| 5,963,645 A | 10/1999 | Kigawa et al. |
| 5,970,486 A | 10/1999 | Yoshida et al. |
| 5,973,683 A | 10/1999 | Cragun et al. |
| 5,974,222 A | 10/1999 | Yuen et al. |
| 5,977,964 A | 11/1999 | Williams et al. |
| 5,986,650 A | 11/1999 | Ellis et al. |
| 5,987,213 A | 11/1999 | Mankovitz et al. |
| 5,988,078 A | 11/1999 | Levine |
| 5,990,890 A | 11/1999 | Etheredge |
| 5,990,927 A | 11/1999 | Hendricks et al. |
| 5,991,498 A | 11/1999 | Young et al. |

(56) References Cited

U.S. PATENT DOCUMENTS

| | | |
|---|---|---|
| 5,991,799 A | 11/1999 | Yen et al. |
| 5,995,155 A | 11/1999 | Schindler et al. |
| 5,997,964 A | 12/1999 | Klima, Jr. et al. |
| 5,999,912 A | 12/1999 | Wodarz et al. |
| 6,002,393 A | 12/1999 | Hite et al. |
| 6,002,394 A | 12/1999 | Schein et al. |
| 6,005,561 A | 12/1999 | Hawkins et al. |
| 6,005,562 A | 12/1999 | Shiga et al. |
| 6,005,563 A | 12/1999 | White et al. |
| 6,005,565 A | 12/1999 | Legall et al. |
| 6,005,597 A | 12/1999 | Barrett et al. |
| 6,005,631 A | 12/1999 | Anderson et al. |
| 6,006,257 A | 12/1999 | Slezak |
| 6,008,802 A | 12/1999 | Iki et al. |
| 6,008,803 A | 12/1999 | Rowe et al. |
| 6,011,546 A | 1/2000 | Bertram |
| 6,014,137 A | 1/2000 | Burns |
| 6,014,184 A | 1/2000 | Knee et al. |
| 6,014,502 A | 1/2000 | Moraes |
| 6,016,141 A | 1/2000 | Knudson et al. |
| 6,018,372 A | 1/2000 | Etheredge |
| 6,018,768 A | 1/2000 | Ullman et al. |
| 6,020,880 A | 2/2000 | Naimpally |
| 6,020,883 A | 2/2000 | Herz et al. |
| 6,020,929 A | 2/2000 | Marshall et al. |
| 6,023,267 A | 2/2000 | Chapuis et al. |
| 6,025,837 A | 2/2000 | Matthews, III et al. |
| 6,025,886 A | 2/2000 | Koda |
| 6,028,599 A | 2/2000 | Yuen et al. |
| 6,029,045 A | 2/2000 | Picco et al. |
| 6,029,195 A | 2/2000 | Herz |
| 6,035,304 A | 3/2000 | Machida et al. |
| 6,038,367 A | 3/2000 | Abescassis |
| 6,047,317 A | 4/2000 | Bisdikian et al. |
| 6,049,824 A | 4/2000 | Simonin |
| 6,052,145 A | 4/2000 | Macrae et al. |
| 6,057,872 A | 5/2000 | Gandelore |
| 6,057,890 A | 5/2000 | Virden et al. |
| 6,061,060 A | 5/2000 | Berry et al. |
| 6,061,097 A | 5/2000 | Satterfield |
| 6,064,376 A | 5/2000 | Berezowski et al. |
| 6,064,980 A | 5/2000 | Jacobi et al. |
| 6,067,303 A | 5/2000 | Aaker et al. |
| 6,067,561 A | 5/2000 | Dillon |
| 6,072,460 A | 6/2000 | Marshall et al. |
| 6,075,526 A | 6/2000 | Rothmuller |
| 6,075,551 A | 6/2000 | Berezowski et al. |
| 6,075,575 A | 6/2000 | Schein et al. |
| 6,078,348 A | 6/2000 | Klosterman et al. |
| 6,081,750 A | 6/2000 | Hoffberg et al. |
| 6,088,722 A | 7/2000 | Herz et al. |
| 6,091,883 A | 7/2000 | Artigalas et al. |
| 6,091,884 A | 7/2000 | Yuen et al. |
| RE36,801 E | 8/2000 | Logan |
| 6,098,065 A | 8/2000 | Skillen et al. |
| 6,104,705 A | 8/2000 | Ismail et al. |
| 6,108,042 A | 8/2000 | Adams et al. |
| 6,111,614 A | 8/2000 | Mugura et al. |
| 6,112,186 A | 8/2000 | Bergh et al. |
| 6,115,057 A | 9/2000 | Kwoh et al. |
| 6,118,492 A | 9/2000 | Milnes et al. |
| 6,119,098 A | 9/2000 | Guyot et al. |
| 6,119,101 A | 9/2000 | Peckover |
| 6,122,011 A | 9/2000 | Dias et al. |
| 6,125,230 A | 9/2000 | Yaginuma |
| 6,130,726 A | 10/2000 | Darbee et al. |
| 6,133,909 A | 10/2000 | Schein et al. |
| 6,133,910 A | 10/2000 | Stinebruner |
| 6,139,177 A | 10/2000 | Venkatraman et al. |
| 6,141,003 A | 10/2000 | Chor et al. |
| 6,141,488 A | 10/2000 | Knudson et al. |
| 6,147,714 A | 11/2000 | Terasawa et al. |
| 6,151,059 A | 11/2000 | Schein et al. |
| 6,151,643 A | 11/2000 | Cheng et al. |
| 6,154,203 A | 11/2000 | Yuen et al. |
| 6,157,411 A | 12/2000 | Williams et al. |
| 6,157,413 A | 12/2000 | Hanafee et al. |
| 6,160,545 A | 12/2000 | Eyer et al. |
| 6,160,546 A | 12/2000 | Thompson et al. |
| 6,160,570 A | 12/2000 | Sitnik |
| 6,163,316 A | 12/2000 | Killian |
| 6,163,345 A | 12/2000 | Noguchi et al. |
| 6,169,542 B1 | 1/2001 | Hooks et al. |
| 6,172,674 B1 * | 1/2001 | Etheredge ............... 715/721 |
| 6,172,677 B1 | 1/2001 | Stautner et al. |
| 6,173,271 B1 | 1/2001 | Goodman et al. |
| 6,175,362 B1 * | 1/2001 | Harms et al. ............ 715/721 |
| 6,177,931 B1 | 1/2001 | Alexander et al. |
| 6,178,446 B1 | 1/2001 | Gerszberg et al. |
| 6,181,335 B1 | 1/2001 | Hendricks et al. |
| 6,184,877 B1 | 2/2001 | Dodson et al. |
| 6,186,443 B1 | 2/2001 | Shaffer |
| 6,191,780 B1 | 2/2001 | Martin et al. |
| 6,202,212 B1 | 3/2001 | Sturgeon et al. |
| 6,208,335 B1 | 3/2001 | Gordon et al. |
| 6,208,799 B1 | 3/2001 | Marsh et al. |
| 6,209,129 B1 | 3/2001 | Carr et al. |
| 6,209,130 B1 | 3/2001 | Rector, Jr. et al. |
| 6,212,553 B1 | 4/2001 | Lee et al. |
| 6,216,264 B1 | 4/2001 | Maze et al. |
| 6,233,389 B1 | 5/2001 | Barton et al. |
| 6,239,794 B1 | 5/2001 | Yuen et al. |
| 6,240,555 B1 | 5/2001 | Shoff et al. |
| 6,253,203 B1 | 6/2001 | O'Flaherty et al. |
| 6,256,071 B1 | 7/2001 | Hiroi |
| 6,256,785 B1 | 7/2001 | Klappert et al. |
| 6,257,268 B1 | 7/2001 | Hope et al. |
| 6,262,721 B1 | 7/2001 | Tsukidate et al. |
| 6,262,772 B1 | 7/2001 | Shen et al. |
| 6,263,501 B1 | 7/2001 | Schein et al. |
| 6,263,507 B1 | 7/2001 | Ahmad et al. |
| 6,268,849 B1 | 7/2001 | Boyer et al. |
| 6,275,268 B1 | 8/2001 | Ellis et al. |
| 6,275,648 B1 | 8/2001 | Knudson et al. |
| 6,279,157 B1 | 8/2001 | Takasu |
| 6,285,713 B1 | 9/2001 | Nakaya et al. |
| 6,286,140 B1 | 9/2001 | Ivanyi |
| 6,289,346 B1 | 9/2001 | Milewski et al. |
| 6,298,482 B1 | 10/2001 | Seidman et al. |
| 6,311,877 B1 | 11/2001 | Yang et al. |
| 6,312,336 B1 | 11/2001 | Handelman et al. |
| 6,317,885 B1 | 11/2001 | Fries |
| 6,320,588 B1 | 11/2001 | Palmer et al. |
| 6,323,911 B1 | 11/2001 | Schein et al. |
| 6,323,931 B1 | 11/2001 | Fujita et al. |
| 6,324,338 B1 | 11/2001 | Wood et al. |
| 6,326,982 B1 | 12/2001 | Wu et al. |
| 6,327,418 B1 | 12/2001 | Barton |
| 6,331,877 B1 | 12/2001 | Bennington et al. |
| 6,335,963 B1 | 1/2002 | Bosco |
| 6,341,195 B1 | 1/2002 | Mankovitz et al. |
| 6,341,374 B2 | 1/2002 | Schein et al. |
| 6,342,926 B1 | 1/2002 | Hanafee et al. |
| 6,357,042 B2 | 3/2002 | Srinivasan et al. |
| 6,359,636 B1 | 3/2002 | Schindler et al. |
| 6,363,525 B1 | 3/2002 | Dougherty et al. |
| 6,373,528 B1 | 4/2002 | Bennington et al. |
| 6,381,582 B1 | 4/2002 | Walker et al. |
| 6,388,714 B1 | 5/2002 | Schein et al. |
| 6,389,593 B1 | 5/2002 | Yamagishi |
| 6,392,710 B1 | 5/2002 | Gonsalves et al. |
| 6,396,546 B1 | 5/2002 | Alten et al. |
| 6,400,407 B1 | 6/2002 | Zigmond et al. |
| 6,405,371 B1 | 6/2002 | Oosterhout et al. |
| 6,408,437 B1 | 6/2002 | Hendricks et al. |
| 6,411,308 B1 | 6/2002 | Blonstein et al. |
| 6,411,696 B1 | 6/2002 | Iverson et al. |
| 6,412,110 B1 | 6/2002 | Schein et al. |
| 6,418,556 B1 | 7/2002 | Bennington et al. |
| 6,421,067 B1 | 7/2002 | Kamen et al. |
| 6,426,779 B1 | 7/2002 | Noguchi et al. |
| 6,437,836 B1 | 8/2002 | Huang et al. |
| 6,438,579 B1 | 8/2002 | Hosken |
| 6,442,332 B1 | 8/2002 | Knudson |

(56) References Cited

U.S. PATENT DOCUMENTS

| | | | |
|---|---|---|---|
| 6,446,261 | B1 | 9/2002 | Rosser |
| 6,453,471 | B1 | 9/2002 | Klosterman |
| 6,463,585 | B1 | 10/2002 | Hendricks et al. |
| 6,469,753 | B1 | 10/2002 | Klosterman et al. |
| 6,470,497 | B1 | 10/2002 | Ellis et al. |
| 6,473,559 | B1 | 10/2002 | Knudson |
| 6,477,579 | B1 | 11/2002 | Kunkel et al. |
| 6,477,705 | B1 | 11/2002 | Yuen et al. |
| 6,486,892 | B1 | 11/2002 | Stern |
| 6,486,920 | B2 | 11/2002 | Arai et al. |
| 6,498,895 | B2 | 12/2002 | Young et al. |
| 6,505,348 | B1 | 1/2003 | Knowles et al. |
| 6,515,680 | B1 | 2/2003 | Hendricks et al. |
| 6,539,548 | B1 | 3/2003 | Hendricks et al. |
| 6,542,169 | B1 | 4/2003 | Marshall et al. |
| 6,545,722 | B1 | 4/2003 | Schultheiss et al. |
| 6,546,556 | B1 | 4/2003 | Kataoka et al. |
| 6,564,005 | B1 | 5/2003 | Berstis |
| 6,564,378 | B1 | 5/2003 | Satterfield et al. |
| 6,564,379 | B1 | 5/2003 | Knudson et al. |
| 6,567,892 | B1 | 5/2003 | Horst et al. |
| 6,567,982 | B1 | 5/2003 | Howe et al. |
| 6,574,424 | B1 | 6/2003 | Dimitri et al. |
| 6,588,013 | B1 | 7/2003 | Lumley et al. |
| 6,600,364 | B1 | 7/2003 | Liang et al. |
| 6,600,503 | B2 | 7/2003 | Stautner et al. |
| 6,601,074 | B1 | 7/2003 | Liebenow |
| 6,606,128 | B2 | 8/2003 | Hanafee et al. |
| 6,611,842 | B1 | 8/2003 | Brown |
| 6,614,987 | B1 | 9/2003 | Ismail et al. |
| 6,622,306 | B1 | 9/2003 | Kamada |
| 6,631,523 | B1 | 10/2003 | Matthews, III et al. |
| 6,651,251 | B1 | 11/2003 | Shoff et al. |
| 6,660,503 | B2 | 12/2003 | Kierulff |
| 6,661,468 | B2 | 12/2003 | Alten et al. |
| 6,665,869 | B1 | 12/2003 | Ellis et al. |
| 6,670,971 | B1 | 12/2003 | Oral |
| 6,675,386 | B1 | 1/2004 | Hendricks et al. |
| 6,687,906 | B1 | 2/2004 | Yuen et al. |
| 6,698,020 | B1 | 2/2004 | Zigmond et al. |
| 6,721,954 | B1 | 4/2004 | Nickum |
| 6,727,914 | B1 | 4/2004 | Gutta |
| 6,732,369 | B1 | 5/2004 | Schein et al. |
| 6,738,978 | B1 | 5/2004 | Hendricks et al. |
| 6,742,183 | B1 | 5/2004 | Reynolds et al. |
| 6,744,967 | B2 | 6/2004 | Kaminski et al. |
| 6,751,800 | B1 | 6/2004 | Fukuda et al. |
| 6,754,904 | B1 | 6/2004 | Cooper et al. |
| 6,756,997 | B1 | 6/2004 | Ward, III et al. |
| 6,757,906 | B1 | 6/2004 | Look et al. |
| 6,760,537 | B2 | 7/2004 | Mankovitz |
| 6,766,100 | B1 | 7/2004 | Komar et al. |
| 6,799,326 | B2 | 9/2004 | Boylan, III et al. |
| 6,799,327 | B1 | 9/2004 | Reynolds et al. |
| 6,828,993 | B1 | 12/2004 | Hendricks et al. |
| 6,865,746 | B1 | 3/2005 | Herrington et al. |
| 6,868,551 | B1 | 3/2005 | Lawler et al. |
| 6,898,762 | B2 | 5/2005 | Ellis et al. |
| 6,938,208 | B2 | 8/2005 | Reichardt |
| 6,973,669 | B2 | 12/2005 | Daniels |
| 6,983,478 | B1 | 1/2006 | Grauch et al. |
| 7,003,792 | B1 | 2/2006 | Yuen |
| 7,028,326 | B1 | 4/2006 | Westlake et al. |
| 7,029,935 | B2 | 4/2006 | Negley et al. |
| 7,058,635 | B1 | 6/2006 | Shah-Nazaroff et al. |
| 7,065,709 | B2 | 6/2006 | Ellis et al. |
| 7,069,576 | B1 | 6/2006 | Knudson et al. |
| 7,073,187 | B1 | 7/2006 | Hendricks et al. |
| 7,088,910 | B2 | 8/2006 | Potrebic et al. |
| 7,096,486 | B1 | 8/2006 | Ukai et al. |
| 7,165,098 | B1 | 1/2007 | Boyer et al. |
| 7,185,355 | B1 | 2/2007 | Ellis et al. |
| 7,187,847 | B2 | 3/2007 | Young et al. |
| 7,266,833 | B2 | 9/2007 | Ward, III et al. |
| 7,287,267 | B2 | 10/2007 | Knudson et al. |
| 7,293,276 | B2 | 11/2007 | Phillips et al. |
| 7,328,450 | B2 | 2/2008 | Macrae et al. |
| 7,370,342 | B2 | 5/2008 | Ismail |
| 7,392,532 | B2 | 6/2008 | White et al. |
| 7,403,935 | B2 | 7/2008 | Horvitz et al. |
| 7,437,751 | B2 | 10/2008 | Daniels |
| 7,440,677 | B2 | 10/2008 | Strasser |
| 7,480,929 | B2 | 1/2009 | Klosterman et al. |
| 7,493,641 | B2 | 2/2009 | Klosterman et al. |
| 7,503,055 | B2 | 3/2009 | Reynolds et al. |
| 7,634,786 | B2 | 12/2009 | Knee et al. |
| 7,882,520 | B2 | 2/2011 | Beach et al. |
| 8,087,050 | B2 | 12/2011 | Ellis et al. |
| 2001/0001160 | A1 | 5/2001 | Shoff et al. |
| 2001/0025375 | A1 | 9/2001 | Ahmad et al. |
| 2001/0027562 | A1 | 10/2001 | Schein et al. |
| 2001/0029610 | A1 | 10/2001 | Corvin et al. |
| 2001/0042246 | A1 | 11/2001 | Yuen et al. |
| 2001/0047298 | A1 | 11/2001 | Moore et al. |
| 2001/0049820 | A1 | 12/2001 | Barton |
| 2001/0054181 | A1 | 12/2001 | Corvin |
| 2002/0026496 | A1 | 2/2002 | Boyer et al. |
| 2002/0042913 | A1 | 4/2002 | Ellis et al. |
| 2002/0042914 | A1 | 4/2002 | Walker et al. |
| 2002/0042918 | A1 | 4/2002 | Townsend et al. |
| 2002/0049973 | A1 | 4/2002 | Alten et al. |
| 2002/0059599 | A1 | 5/2002 | Schein et al. |
| 2002/0059602 | A1 | 5/2002 | Macrae et al. |
| 2002/0073424 | A1 | 6/2002 | Ward, III et al. |
| 2002/0083439 | A1 | 6/2002 | Eldering |
| 2002/0092017 | A1 | 7/2002 | Klosterman et al. |
| 2002/0095676 | A1 | 7/2002 | Knee et al. |
| 2002/0112249 | A1 | 8/2002 | Hendricks et al. |
| 2002/0120933 | A1 | 8/2002 | Knudson et al. |
| 2002/0124249 | A1 | 9/2002 | Shintani et al. |
| 2002/0138840 | A1 | 9/2002 | Schein et al. |
| 2002/0174424 | A1 | 11/2002 | Chang et al. |
| 2002/0174430 | A1 | 11/2002 | Ellis et al. |
| 2002/0191954 | A1 | 12/2002 | Beach et al. |
| 2002/0194596 | A1 | 12/2002 | Srivastava |
| 2003/0005432 | A1 | 1/2003 | Ellis et al. |
| 2003/0005445 | A1 | 1/2003 | Schein et al. |
| 2003/0009766 | A1 | 1/2003 | Marolda |
| 2003/0110499 | A1 | 6/2003 | Knudson et al. |
| 2003/0115602 | A1 | 6/2003 | Knee et al. |
| 2003/0118323 | A1 | 6/2003 | Ismail et al. |
| 2003/0163813 | A1 | 8/2003 | Klosterman et al. |
| 2003/0164858 | A1 | 9/2003 | Klosterman et al. |
| 2003/0188310 | A1 | 10/2003 | Klosterman et al. |
| 2003/0188311 | A1 | 10/2003 | Yuen et al. |
| 2003/0196201 | A1 | 10/2003 | Schein et al. |
| 2003/0196203 | A1 | 10/2003 | Ellis et al. |
| 2003/0204847 | A1 | 10/2003 | Ellis et al. |
| 2003/0208756 | A1 | 11/2003 | Macrae et al. |
| 2003/0208758 | A1 | 11/2003 | Schein et al. |
| 2003/0210898 | A1 | 11/2003 | Juen et al. |
| 2004/0003407 | A1 | 1/2004 | Hanafee et al. |
| 2004/0049787 | A1 | 3/2004 | Maissel et al. |
| 2004/0078809 | A1 | 4/2004 | Drazin |
| 2004/0078815 | A1 | 4/2004 | Lemmons et al. |
| 2004/0098744 | A1 | 5/2004 | Gutta |
| 2004/0111742 | A1 | 6/2004 | Hendricks et al. |
| 2004/0111745 | A1 | 6/2004 | Schein et al. |
| 2004/0139465 | A1 | 7/2004 | Matthews, III et al. |
| 2004/0168189 | A1 | 8/2004 | Reynolds et al. |
| 2004/0194131 | A1 | 9/2004 | Ellis et al. |
| 2004/0194138 | A1 | 9/2004 | Boylan, III et al. |
| 2004/0210935 | A1 | 10/2004 | Schein et al. |
| 2004/0221310 | A1 | 11/2004 | Herrington et al. |
| 2005/0010949 | A1 | 1/2005 | Ward et al. |
| 2005/0015804 | A1 | 1/2005 | LaJoie et al. |
| 2005/0015815 | A1 | 1/2005 | Shoff et al. |
| 2005/0097622 | A1 | 5/2005 | Zigmond et al. |
| 2005/0138660 | A1 | 6/2005 | Boyer et al. |
| 2005/0155056 | A1 | 7/2005 | Knee et al. |
| 2005/0157217 | A1 | 7/2005 | Hendricks |
| 2005/0198668 | A1 | 9/2005 | Yuen et al. |
| 2005/0204382 | A1 | 9/2005 | Ellis |
| 2005/0204388 | A1 | 9/2005 | Knudson et al. |

(56) References Cited

U.S. PATENT DOCUMENTS

| | | |
|---|---|---|
| 2005/0216936 A1 | 9/2005 | Knudson et al. |
| 2005/0229214 A1 | 10/2005 | Young et al. |
| 2005/0229215 A1 | 10/2005 | Schein et al. |
| 2005/0235320 A1 | 10/2005 | Maze et al. |
| 2005/0240962 A1 | 10/2005 | Cooper et al. |
| 2005/0240968 A1 | 10/2005 | Knudson et al. |
| 2005/0244138 A1 | 11/2005 | O'Connor et al. |
| 2005/0273819 A1 | 12/2005 | Knudson et al. |
| 2005/0278741 A1 | 12/2005 | Robarts et al. |
| 2005/0283796 A1 | 12/2005 | Flickinger |
| 2006/0037044 A1 | 2/2006 | Daniels |
| 2006/0140584 A1 | 6/2006 | Ellis et al. |
| 2006/0212900 A1 | 9/2006 | Ismail et al. |
| 2006/0248555 A1 | 11/2006 | Eldering |
| 2007/0016926 A1 | 1/2007 | Ward et al. |
| 2007/0033613 A1 | 2/2007 | Ward et al. |
| 2007/0157242 A1 | 7/2007 | Cordray et al. |
| 2007/0162934 A1 | 7/2007 | Roop et al. |
| 2007/0186240 A1 | 8/2007 | Ward et al. |
| 2007/0204308 A1 | 8/2007 | Nicholas et al. |
| 2007/0271582 A1 | 11/2007 | Ellis et al. |
| 2008/115169 A1 | 5/2008 | Ellis et al. |
| 2008/0127265 A1 | 5/2008 | Ward et al. |
| 2008/0127266 A1 | 5/2008 | Ward et al. |
| 2008/0178221 A1 | 7/2008 | Schein et al. |
| 2008/0184305 A1 | 7/2008 | Schein et al. |
| 2008/0184308 A1 | 7/2008 | Herrington et al. |
| 2008/0184312 A1 | 7/2008 | Schein et al. |
| 2008/0184315 A1 | 7/2008 | Ellis et al. |
| 2008/0189744 A1 | 8/2008 | Schein et al. |
| 2008/0235725 A1 | 9/2008 | Hendricks |
| 2008/0288980 A1 | 11/2008 | Schein et al. |
| 2009/0070817 A1 | 3/2009 | Ellis et al. |
| 2010/0146543 A1 | 6/2010 | Knee et al. |
| 2011/0185387 A1 | 7/2011 | Schein et al. |
| 2011/0209170 A1 | 8/2011 | Schein et al. |

FOREIGN PATENT DOCUMENTS

| | | |
|---|---|---|
| AU | 733993 | 2/1999 |
| AU | 749209 | 10/2002 |
| CA | 1030505 | 5/1978 |
| CA | 1187197 | 5/1985 |
| CA | 1188811 | 6/1985 |
| CA | 1196082 | 10/1985 |
| CA | 1200911 | 2/1986 |
| CA | 2151458 | 6/1994 |
| CA | 2164608 | 12/1994 |
| CA | 2297039 | 1/1999 |
| CA | 2312326 | 6/1999 |
| CN | 1200221 | 11/1998 |
| CN | 1555191 | 12/2004 |
| CN | 1567986 | 1/2005 |
| DE | 2918846 | 11/1980 |
| DE | 3246225 | 6/1984 |
| DE | 3337204 | 4/1985 |
| DE | 3621263 | 1/1988 |
| DE | 3640436 | 6/1988 |
| DE | 3909334 | 9/1990 |
| DE | 4201031 | 7/1993 |
| DE | 4217246 | 12/1993 |
| DE | 4240187 | 6/1994 |
| DE | 4407701 | 9/1995 |
| DE | 4440419 | 5/1996 |
| DE | 19531121 | 2/1997 |
| DE | 19740079 | 3/1999 |
| DE | 19931046 | 1/2001 |
| EP | 0 239 884 | 10/1987 |
| EP | 0276425 | 8/1988 |
| EP | 0 396 062 | 11/1990 |
| EP | 0 401 930 | 12/1990 |
| EP | 0 408 892 | 1/1991 |
| EP | 0 420 123 | 4/1991 |
| EP | 0 424 648 | 5/1991 |
| EP | 0 444 496 | 9/1991 |
| EP | 0 447 968 | 9/1991 |
| EP | 0 532 322 | 3/1993 |
| EP | 0 550 911 | 7/1993 |
| EP | 0 560 593 | 9/1993 |
| EP | 0 572 090 | 12/1993 |
| EP | 0617563 | 9/1994 |
| EP | 0669760 | 8/1995 |
| EP | 0 682 452 | 11/1995 |
| EP | 0 721 253 | 7/1996 |
| EP | 0723369 | 7/1996 |
| EP | 0 725 539 | 8/1996 |
| EP | 0 752 767 | 1/1997 |
| EP | 0 753 964 | 1/1997 |
| EP | 0 762 751 | 3/1997 |
| EP | 0 772 360 | 5/1997 |
| EP | 0 774 866 | 5/1997 |
| EP | 0 775 417 | 5/1997 |
| EP | 0 784 405 | 7/1997 |
| EP | 0789488 | 8/1997 |
| EP | 0 805 594 | 11/1997 |
| EP | 0 822 718 | 2/1998 |
| EP | 0 827 340 | 3/1998 |
| EP | 0 834 798 | 4/1998 |
| EP | 0836320 | 4/1998 |
| EP | 0837599 | 4/1998 |
| EP | 0 848 554 | 6/1998 |
| EP | 0 849 948 | 6/1998 |
| EP | 0 851 681 | 7/1998 |
| EP | 0 852 442 | 7/1998 |
| EP | 0 854 645 | 7/1998 |
| EP | 0852361 | 7/1998 |
| EP | 0854654 | 7/1998 |
| EP | 0856847 | 8/1998 |
| EP | 0 880 856 | 12/1998 |
| EP | 0 905 985 | 3/1999 |
| EP | 0 924 927 | 6/1999 |
| EP | 0921682 | 6/1999 |
| EP | 0940983 | 6/1999 |
| EP | 0 935 393 | 8/1999 |
| EP | 0 944 253 | 9/1999 |
| EP | 0742669 | 10/1999 |
| EP | 0 963 119 | 12/1999 |
| EP | 0 988 876 | 3/2000 |
| EP | 1014715 | 6/2000 |
| EP | 1059749 | 12/2000 |
| EP | 1 095 504 | 5/2001 |
| EP | 1135929 | 9/2001 |
| EP | 1 036 466 | 3/2003 |
| EP | 0945003 | 8/2003 |
| FR | 2662895 | 12/1991 |
| GB | 1554411 | 10/1979 |
| GB | 2034995 | 6/1980 |
| GB | 2126002 | 3/1984 |
| GB | 2185670 | 7/1987 |
| GB | 2227622 | 8/1990 |
| GB | 2229595 | 9/1990 |
| GB | 2256546 | 12/1992 |
| GB | 2264409 | 8/1993 |
| GB | 2305049 | 3/1997 |
| GB | 2309134 | 7/1997 |
| GB | 2325537 | 11/1998 |
| GB | 2346251 | 8/2000 |
| HK | 1035285 | 3/2005 |
| JP | 58137334 | 8/1983 |
| JP | 58196738 | 11/1983 |
| JP | 58210776 | 12/1983 |
| JP | 59141878 | 8/1984 |
| JP | 6061935 | 4/1985 |
| JP | 61050470 | 3/1986 |
| JP | 61074476 | 4/1986 |
| JP | 62060370 | 3/1987 |
| JP | 62060384 | 3/1987 |
| JP | 06392177 | 4/1988 |
| JP | 63234679 | 9/1988 |
| JP | 1093933 | 4/1989 |
| JP | 01307944 | 12/1989 |
| JP | 02048879 | 2/1990 |
| JP | 03063990 | 3/1991 |

(56) References Cited

FOREIGN PATENT DOCUMENTS

| | | |
|---|---|---|
| JP | 04079053 | 3/1992 |
| JP | 04227380 | 8/1992 |
| JP | 04250760 | 9/1992 |
| JP | 4335395 | 11/1992 |
| JP | 05183826 | 7/1993 |
| JP | 05284437 | 10/1993 |
| JP | 06021907 | 1/1994 |
| JP | 06124309 | 5/1994 |
| JP | 06504165 | 5/1994 |
| JP | 06243539 | 9/1994 |
| JP | 07020254 | 1/1995 |
| JP | 06038165 | 2/1995 |
| JP | 07050259 | 2/1995 |
| JP | 07076592 | 3/1995 |
| JP | 07123326 | 5/1995 |
| JP | 07135621 | 5/1995 |
| JP | 07147657 | 6/1995 |
| JP | 07160732 | 6/1995 |
| JP | 07162776 | 6/1995 |
| JP | 07193762 | 7/1995 |
| JP | 07288759 | 10/1995 |
| JP | 07321748 | 12/1995 |
| JP | 0832528 | 2/1996 |
| JP | 0832538 | 2/1996 |
| JP | 08125497 | 5/1996 |
| JP | 08130517 | 5/1996 |
| JP | 08506941 | 7/1996 |
| JP | 08251122 | 9/1996 |
| JP | 08275077 | 10/1996 |
| JP | 937168 | 2/1997 |
| JP | 09037151 | 2/1997 |
| JP | 09037172 | 2/1997 |
| JP | 09070020 | 3/1997 |
| JP | 09083888 | 3/1997 |
| JP | 09102827 | 4/1997 |
| JP | 09162821 | 6/1997 |
| JP | 1042235 | 2/1998 |
| JP | 10501936 | 2/1998 |
| JP | 10143340 | 5/1998 |
| JP | 10143349 | 5/1998 |
| JP | 10257400 | 9/1998 |
| JP | 10512420 | 11/1998 |
| JP | 2838892 | 12/1998 |
| JP | 11261917 | 9/1999 |
| JP | 11308561 | 11/1999 |
| JP | 2000013708 | 1/2000 |
| JP | 2000138886 | 5/2000 |
| JP | 2000224533 | 8/2000 |
| JP | 2000235546 | 8/2000 |
| JP | 2000306314 | 11/2000 |
| JP | 2001088372 | 4/2001 |
| JP | 2001165669 | 6/2001 |
| JP | 2001167522 | 6/2001 |
| JP | 2001213595 | 8/2001 |
| JP | 2001257950 | 9/2001 |
| JP | 20011513595 | 9/2001 |
| JP | 2002279969 | 9/2002 |
| JP | 2006340396 | 12/2006 |
| JP | 4062577 | 3/2008 |
| JP | 2010119149 | 5/2010 |
| WO | WO 86/01359 | 2/1986 |
| WO | WO 86/01962 | 3/1986 |
| WO | WO 87/03766 | 6/1987 |
| WO | WO 88/04057 | 6/1988 |
| WO | WO 88/04507 | 6/1988 |
| WO | WO 89/02682 | 3/1989 |
| WO | WO 89/03085 | 4/1989 |
| WO | WO 89/12370 | 12/1989 |
| WO | WO 90/01243 | 2/1990 |
| WO | WO 90/15507 | 12/1990 |
| WO | WO 91/00670 | 1/1991 |
| WO | WO 91/05436 | 4/1991 |
| WO | WO 91/18476 | 11/1991 |
| WO | WO 92/04801 | 3/1992 |
| WO | WO 93/04473 | 3/1993 |
| WO | WO 93/05452 | 3/1993 |
| WO | WO 93/11638 | 6/1993 |
| WO | WO 93/11639 | 6/1993 |
| WO | WO 93/11640 | 6/1993 |
| WO | WO 93/23957 | 11/1993 |
| WO | WO 94/13107 | 6/1994 |
| WO | WO 94/14281 | 6/1994 |
| WO | WO 94/14282 | 6/1994 |
| WO | WO 94/14283 | 6/1994 |
| WO | WO 94/14284 | 6/1994 |
| WO | WO 94/21085 | 9/1994 |
| WO | WO 94/23383 | 10/1994 |
| WO | WO 94/29811 | 12/1994 |
| WO | WO 95/01056 | 1/1995 |
| WO | WO 95/01057 | 1/1995 |
| WO | WO 95/01058 | 1/1995 |
| WO | WO 95/01059 | 1/1995 |
| WO | WO 95/06389 | 3/1995 |
| WO | WO 95/07003 | 3/1995 |
| WO | WO 95/10910 | 4/1995 |
| WO | WO 95/15649 | 6/1995 |
| WO | WO 95/15657 | 6/1995 |
| WO | WO 95/15658 | 6/1995 |
| WO | WO 95/16568 | 6/1995 |
| WO | WO 95/19092 | 7/1995 |
| WO | WO 95/26608 | 10/1995 |
| WO | WO 95/28055 | 10/1995 |
| WO | WO 95/28799 | 10/1995 |
| WO | WO 95/30961 | 11/1995 |
| WO | WO 95/31069 | 11/1995 |
| WO | WO 95/32583 | 11/1995 |
| WO | WO 95/32585 | 11/1995 |
| WO | WO 95/32587 | 11/1995 |
| WO | WO 96/07270 | 3/1996 |
| WO | WO 96/08109 | 3/1996 |
| WO | WO 96/08113 | 3/1996 |
| WO | WO 96/09721 | 3/1996 |
| WO | WO 96/13932 | 5/1996 |
| WO | WO 96/13935 | 5/1996 |
| WO | WO 96-17467 | 6/1996 |
| WO | WO 96/17473 | 6/1996 |
| WO | WO 96/21990 | 7/1996 |
| WO | WO 96/26605 | 8/1996 |
| WO | WO 96/27270 | 9/1996 |
| WO | WO 96/27982 | 9/1996 |
| WO | WO 96/27989 | 9/1996 |
| WO | WO 96/31980 | 10/1996 |
| WO | WO 96/34467 | 10/1996 |
| WO | WO 96/34486 | 10/1996 |
| WO | WO 96/34491 | 10/1996 |
| WO | WO 96/36172 | 11/1996 |
| WO | WO 96/37075 | 11/1996 |
| WO | WO 96/37996 | 11/1996 |
| WO | WO 96/38799 | 12/1996 |
| WO | WO 96/38962 | 12/1996 |
| WO | WO 96/41470 | 12/1996 |
| WO | WO 96/41471 | 12/1996 |
| WO | WO 96/41477 | 12/1996 |
| WO | WO 96/41478 | 12/1996 |
| WO | WO 97/02702 | 1/1997 |
| WO | WO 97/04595 | 2/1997 |
| WO | WO 97/07656 | 3/1997 |
| WO | WO 97/12486 | 4/1997 |
| WO | WO 97/13368 | 4/1997 |
| WO | WO 97/17774 | 5/1997 |
| WO | WO 97/18675 | 5/1997 |
| WO | WO 97/26612 | 7/1997 |
| WO | WO 97/31480 | 8/1997 |
| WO | WO 97/41673 | 11/1997 |
| WO | WO 97/42763 | 11/1997 |
| WO | WO 97/46943 | 12/1997 |
| WO | WO 97/47124 | 12/1997 |
| WO | WO 97/48230 | 12/1997 |
| WO | WO 97/49237 | 12/1997 |
| WO | WO 97/49241 | 12/1997 |
| WO | WO 97/49242 | 12/1997 |
| WO | WO 97/50251 | 12/1997 |
| WO | WO 9745786 | 12/1997 |
| WO | WO 98/06219 | 2/1998 |

(56) References Cited

FOREIGN PATENT DOCUMENTS

| | | |
|---|---|---|
| WO | WO 98/10589 | 3/1998 |
| WO | WO 98/16062 | 4/1998 |
| WO | WO 98/17063 | 4/1998 |
| WO | WO 98/17064 | 4/1998 |
| WO | WO 98/20675 | 5/1998 |
| WO | WO 98/21664 | 5/1998 |
| WO | WO 98/21877 | 5/1998 |
| WO | WO 98/26569 | 6/1998 |
| WO | WO 98/26584 | 6/1998 |
| WO | WO 98/27723 | 6/1998 |
| WO | WO 98/28906 | 7/1998 |
| WO | WO 98/31148 | 7/1998 |
| WO | WO 98/37695 | 8/1998 |
| WO | WO 98/41020 | 9/1998 |
| WO | WO 98/43183 | 10/1998 |
| WO | WO 98/47279 | 10/1998 |
| WO | WO 98/48566 | 10/1998 |
| WO | WO 98/56172 | 12/1998 |
| WO | WO 98/56173 | 12/1998 |
| WO | WO 99/01984 | 1/1999 |
| WO | WO 99/03267 | 1/1999 |
| WO | WO 99/04561 | 1/1999 |
| WO | WO 99/07142 | 2/1999 |
| WO | WO 99/14947 | 3/1999 |
| WO | WO 99/18721 | 4/1999 |
| WO | WO 99/18722 | 4/1999 |
| WO | WO 99/29109 | 6/1999 |
| WO | WO 99/30491 | 6/1999 |
| WO | WO 99/31480 | 6/1999 |
| WO | WO 99/35827 | 7/1999 |
| WO | WO 99/37045 | 7/1999 |
| WO | WO 99/45700 | 9/1999 |
| WO | WO 99/45701 | 9/1999 |
| WO | WO 99/45702 | 9/1999 |
| WO | WO 99/52279 | 10/1999 |
| WO | WO 99/52285 | 10/1999 |
| WO | WO 99/56466 | 11/1999 |
| WO | WO 99/56473 | 11/1999 |
| WO | WO 99/60493 | 11/1999 |
| WO | WO 99/60783 | 11/1999 |
| WO | WO 99/60789 | 11/1999 |
| WO | WO 99/65237 | 12/1999 |
| WO | WO 99/66725 | 12/1999 |
| WO | WO 00/04706 | 1/2000 |
| WO | WO 00/04708 | 1/2000 |
| WO | WO 00/04709 | 1/2000 |
| WO | WO 00/05889 | 2/2000 |
| WO | WO 00/07368 | 2/2000 |
| WO | WO 00/08850 | 2/2000 |
| WO | WO 00/08851 | 2/2000 |
| WO | WO 00/08852 | 2/2000 |
| WO | WO 00/11865 | 3/2000 |
| WO | WO 00/11869 | 3/2000 |
| WO | WO 00/13415 | 3/2000 |
| WO | WO 00/13416 | 3/2000 |
| WO | WO 00/16336 | 3/2000 |
| WO | WO 00/16548 | 3/2000 |
| WO | WO 00/27122 | 5/2000 |
| WO | WO 00/28734 | 5/2000 |
| WO | WO 00/28739 | 5/2000 |
| WO | WO 00/33160 | 6/2000 |
| WO | WO 00/33224 | 6/2000 |
| WO | WO 00/33560 | 6/2000 |
| WO | WO 00/33573 | 6/2000 |
| WO | WO 00/49801 | 8/2000 |
| WO | WO 00/58833 | 10/2000 |
| WO | WO 00/58967 | 10/2000 |
| WO | WO 00/59214 | 10/2000 |
| WO | WO 00/59223 | 10/2000 |
| WO | WO 00/62298 | 10/2000 |
| WO | WO 00/62299 | 10/2000 |
| WO | WO 00/62533 | 10/2000 |
| WO | WO 00/67475 | 11/2000 |
| WO | WO 00/79798 | 12/2000 |
| WO | WO 01/01677 | 1/2001 |
| WO | WO 01/06784 | 1/2001 |
| WO | WO 01/10128 | 2/2001 |
| WO | WO 01/11865 | 2/2001 |
| WO | WO 01/15438 | 3/2001 |
| WO | WO 01/22729 | 3/2001 |
| WO | WO 01/35662 | 5/2001 |
| WO | WO 01/46843 | 6/2001 |
| WO | WO 01/47238 | 6/2001 |
| WO | WO 01/47249 | 6/2001 |
| WO | WO 01/47257 | 6/2001 |
| WO | WO 01/47273 | 6/2001 |
| WO | WO 01/47279 | 6/2001 |
| WO | WO 01/76239 | 10/2001 |
| WO | WO 01/76248 | 10/2001 |
| WO | WO 01/89213 | 11/2001 |
| WO | WO 02/31731 | 4/2002 |
| WO | WO 02/078317 | 10/2002 |
| WO | WO 02/084992 | 10/2002 |

OTHER PUBLICATIONS

U.S. Appl. No. 09/330,792, Jun. 11, 1999, Knudson et al.

U.S. Appl. No. 09/332,244, Jun. 11, 1999, Ellis et al.

U.S. Appl. No. 09/356,268, Jul. 16, 1999, Rudnick et al.

272OR Satellite Receiver User's Guide, General Instrument, 1991, pp. 58-61.

Addressable Converters: A New Development at CableData, Via Cable, vol. 1, No. 12, Dec. 1981.

Advertisement for "TV Decisions," Cable Vision, Aug. 4, 1986.

Alexander, Michael "Visualizing cleared-off desktops," Computerworld, May 6, 1991, p. 20.

Antonoff, M., "Stay Tuned for Smart TV," Popular Science, Nov. 1990, pp. 62-65.

Bach, U. et al., "Multimedia TV Set, Part 1" Radio-Fernsehen Elektronik (RFE), Sep. 1996, pp. 28, 30, 31. (English language translation attached.).

Bach, U. et al., "Multimedia TV Set, Part 2 and Conclusion," Radio-Fernsehen Elektronik (RFE), Oct. 1996, pp. 38-40. (English language translation attached.).

Baer, R.H, "Innovative Add-On TV Products," IEEE Transactions on Consumer Electronics, vol. CE-25, Nov. 1979, pp. 765-771.

Bell Atlantic Buys Cable TV Company for $22bn, Financial Times (London), Oct. 14, 1993 p. 65.

Bensch, U., "VPV Videotext Programs Videorecorder," IEEE Paper, Jun. 1988, pp. 788-792.

Bestler, Caitlin "Flexible Data Structures and Interface Rituals for Rapid Development of OSD Applications," Proceedings from the Eleven Technical Sessions, 42nd Annual Convention and Exposition and Exploration of the NCTA, San Francisco, CA Jun. 6-9, 1993, pp. 223-236. Jun. 6, 1993.

Brochure, "A New Approach to Addressability," CableData, undated.

Brochure, "Westar and Videotoken Network Present The CableComputer," Revised Aug. 15, 1985 (Plaintiff's 334).

Brochure, Time Inc., "Now, Through the Advances of the Computer Age, You Can Get the Information You Want, When You Want It. Instantly and Conveniently, on Your Home TV Screen," Time Teletext, Time Video Information Services, Inc., undated (V 79167-79175).

Brochure, VTN "Videotoken Network, New Dimension Television," Dec. 1985 (Plaintiffs Exhibit 313).

Brugliera, Vito., "Digital On-Screen Display—A New Technology for the Consumer Interface," Symposium Record Cable TV Sessions of the 18th International Television Symposium & Technical Exhibition—Montreux, Switzerland, Jun. 10-15, 1993, pp. 571-586.

Cable Computer User's Guide, Rev. 1, Dec. 1985 (Plaintiff's Exhibit 289).

Cable Television Equipment, Jerrold Communications Publication, dated 1992 and 1993, pp. 8-2.1 to 8-6 and 8-14.1 to 8-14.3.

CableData, Roseville Consumer Presentation, Mar. 1985.

Carne, E.B., "The Wired Household," IEEE Spectrum, vol. 16 No. 10, Oct. 1979, pp. 61-66.

Chan, Patrick P., "Learning Considerations in User Interface Design: The Room Model," Publication of the Software Portability Laboratory, University of Waterloo, Ontario, Canada, Jul. 1984.

(56) References Cited

OTHER PUBLICATIONS

Christodoulakis, Steven and Graham, Stephen "Browsing Within Time-Driven Multimedia Documents," publication of the Institute for Computer Research, University of Waterloo, Waterloo, Ontario, Canada Jul. 1988 pp. 219-227.
Computer Network: Current Status and Outlook on Leading Science and Technology, Bureau of Science & Technology (Japan), vol. 1, Dec. 1986.
Cox, J. et al, "Extended Services in A Digital Compression System," Proceedings from Eleven Technical Sessions: 42nd Annual Convention and Exposition of the National Cable Television Association, Jun. 1993, pp. 185-191.
Creation/Modification of the Audio Signal Processor Setup for a PC Audio Editor, IBM Technical Disclosure Bulletin, vol. 30, No. 10, Mar. 1988, pp. 367-376.
D2B—Home Bus Fur Audio and Video, Selektor, Apr. 1990, pp. 10, 12.
Damouny, N.G., "Teletext Decoders—Keeping Up With the Latest Advances," IEEE Transactions on Consumer Electronics, vol. CE-30, No. 3, Aug. 1984, pp. 429-435.
Declaration Under 37 C.F.R. § 1.132 of Richard E. Glassberg, signed Oct. 20, 2006, filed Oct. 24, 2006, from U.S. Appl. No. 10/346,266.
Dial M for Movie, Funkschau 11/94 Perspektiven, Video on Demand, pp. 78-79. (English language translation attached).
Digital Video Broadcasting (DVB); DVB specification for data broadcasting, European Telecommunication Standards Institute, Draft EN 301 192 V1.2.1 (Jan. 1999).
DiRosa, S. "BIGSURF Netguide", Jul. 1995, vol. 3.1 (Sections 18,21, and 28—renumbered as pp. 1-27).
Duck Tales, (1987)[TV Series 1987-1990], Internet Movie Database (IMDB) [Retrieved on Apr. 7, 2007].
Edwardson, S.M., & Gee, A., "CEEFAX: A Proposed New Broadcasting Service," Journal of the SMPTE, Jan. 1974, vol. 83 No. 1, pp. 14-19.
Eitz, Gerhard, "Zukunftige Informations-und Datenangebote beim dig italen Femsehen—EPG Und 'Lesezeichen'," RTM Rundfunktechnische Mitteilungen, Jun. 1997, vol. 41, pp. 67-72.
Electronic Programme Guide (EPG); Protocol for a TV Guide using electronic data transmission, by European Telecommunication Standards Institute, May 1997, Valbonne, France, publication No. ETS 300 707.
Enhanced Content Specification, ATVEF, from the internet at http://www.atvetcomilibraryispec.html, printed Aug. 22, 2001, the document bears a Copyright date of 1998, 1999, 2000.
European Telecommunication Standard, "Electronic Programme Guide (EPG); Protocol for a TV Guide using electronic data transmission," pp. 1-45, sections 1-11.12.7 and annex A-P, bearing a date of May 1997.
European Telecommunications Standards: Digital Broadcasting Systems for Television Sound and Data Services; Specification for Service Information (SI) in Digital Video Broadcasting (DVB) Systems, European Telecommunications Standards Institute, Dec. 1994.
Facsimile Transmission, NHK Research Monthly Report, Dec. 1987(Unknown author).
Getting Started Installation Guide, Using StarSight 1 Manual, and Remote Control Quick Reference Guide.
Hartwig, Rautenberg, Bollmann, "Broadcasting and Processing of Program Guides for Digital TV," SMPTE Journal, pp. 727-732, Oct. 1997.
Hedger, J., "Telesoftware: Home Computing Via Broadcast Teletext," IEEE Transactions on Consumer Electronics, vol. CE-25, No. 3, Jul. 1979, pp. 279-287.
Hiroshi Ishii et al, "Clearface: Translucent Multiuser Interface for TeamWorkStation," ECSCW, Sep. 1991, pp. 6-10.
Hiroshi Ishii et al, "Toward an Open Shared Workspace: Computer and Video Fusion Approach of Team Workstation," Communications of the ACM, Dec. 1991, vol. 34 No. 12, pp. 37-50.
Hirotada Ueda et al, "Impact: An Interactive Natural-Motion-Picture Dedicated Multi-Media Authoring System," Communications of the ACM, Mar. 1991, pp. 343-350.
Hofmann, Neumann, Oberlies & Schadwinkel, "Videotext Programmiert Videorecorder," Rundfunktechnischen Mitteilungen, (Broadcast Engineering Reports), vol. 26 No. 6, pp. 254-257, Nov.-Dec. 1982.
Installation Guide, "Getting Started 1" Manual, and Remote Control "Quick Reference Guide".
Instruction Manual, "Using StarSight 2," StarSight Telecast, Inc., StarSight CB 1500 Customer Letter, 1994.
Instructional Manual, "Sonic The Hedgehog," Sega of America, 1992.
Interactive Computer Conference Server, IBM Technical Bulletin, vol. 34, No. 7A, Dec. 1991, pp. 375-377.
Interface Device for Conventional TVs to Improve Functionality, IBM Technical Disclosure Bulletin, vol. 36, No. 7, Jul. 1993, pp. 53-54.
James Sorce, David Fay, Brian Raila and Robert Virzi, "Designing a Broadband Residential Entertainment Service: A Case Study," GTE Laboratories Incorporated, undated, pp. 141-148.
James, A., "Oracle—Broadcasting the Written Word," Wireless World, Jul. 1973, vol. 79 No. 1453, pp. 314-316.
Judice, C.N., "Move Over Cable, Here Comes Video Via Voice Lines," Network World, Sep. 1986, p. 26.
Kai et al., Development of a Simulation System for Integrated Services Television, Report from Information Processing Society of Japan, Japan, Sep. 13, 1996, vol. 96, No. 90 p. 13-20.
Karstad, K., "Microprocessor Control for Color-TV Receivers," IEEE Transactions on Consumer Electronics, vol. CE-26, May 1980, pp. 149-155.
Kornhaas, W., "Von der Textprogrammierung uber TOP zum Archivsystem," Radio Femsehen Elektronik, vol. 40, No. 8, Aug. 30, 1991, pp. 465-468, XP 000240875 Veb Verlag Technik Berlin, DE ISSN: 1436-1574.
Listing of computer code for operating system within the Cable Computer in 1985 (Plaintiffs Exhibit 298).
Listing of computer code for Video HTU Program (Plaintiffs Exhibit 299).
Lists> What's on Tonite! TV Listings (fwd), Internet article (On line), Jan. 28, 1995, XP 002378869 [Retrieved on Apr. 28, 2006].
Lowenstein, R.L. and Aller, H.E., "The Inevitable March of Videotex," Technology Review, vol. 88, Oct. 1985, p. 22.
M/A-COM, Inc., "Videocipher 11 Satellite Descrambler Owners Manual," dated Feb. 1986, pp. 1-24.
Mack Daily, "Addressable Decoder with Downloadable Operation," Proceedings from the Eleven Technical Sessions, 42nd Annual Convention and Exposition of the NCTA, Jun. 6-9, 1993, pp. 82-89.
Mannes, G., "Smart Screens: Development of Personal Navigation Systems for TV Viewers," Video Magazine, Dec. 1993.
Mar. 19, 1985 letter from G. Knapp of CableData to R. Hansen of Weststar Communications, Inc. (Plaintiffs Exhibit 325).
Markowitz, A. "Companies Jump on Interactive Bandwagon," Discount Store News, Dec. 6, 1993, pp. 4 and 131.
McKenzie, G.A., "Oracle—An Information Broadcasting Service Using Data Transmission in the Vertical Interval," Journal of the SMPTE, Jan. 1974, vol. 83 No. 1, pp. 6-10.
Merrell, R.G., "Tac Timer," 1986 NCTA Technical Papers, pp. 203-206.
MSI Datacasting Systems, TV Communications Journal, Jan. 1973.
Neumann, Andreas, "WDR Online Aufbau and Perspektiven Automatisierter Online-Dienste im WDR," RTM Rundfunktechnische Mitteilungen, vol. 41, pp. 56-66, Jun. 1997.
No subject, "Tom Schauer (tschauer@moscow.com)Thu, Sep. 28, 1995 16:46:48-700," XP-002378870 [Retrieved from the Internet Apr. 28, 2006].
Open TV fur interaktives Fernsehen, Trend and Technik, 9-95 RFE, p. 100. (English language translation attached).
Open TV Launches OpenStreamerTM Technology for Broadcasters to Deliver First Ever Real-Time Digital Interactive Television, from the internet at http://www.opentv.corninewsiopenstreamer press final htm, printed on Jun. 28, 1999, the document bears a copyright date of 1999.
Pfister, Larry T., "Teletext: Its Time Has Come," Prepared for the IGC Videotext / Teletext Conference, Andover, Massachusetts, Dec. 14, 1982, pp. 1-11.

(56) References Cited

OTHER PUBLICATIONS

Prevue Guide Brochure, Spring 1984.
Prevue Guide Brochure, Spring 1994.
Prevue Networks and OpenTV(R) Agree to Work Together on Deploying Interactive Program Guides Worldwide, from the internet at http://www.opentv.corninews/prevuefinal.htm, printed on Jun. 28, 1999.
Probe XL Brochure, Auto Tote Systems Inc., (Newark, Delaware) (undated) 57 pgs.
Prodigy Launches Interactive TV Listing, Apr. 22, 1994 public Broadcasting Report.
Rayers, D.J., "Telesoftware by Teletext," 1984 IEEE Conference Papers, vol. 240, p. 323.
Rewind, reply and unwind with new high-tech TV devices, by Lawrence J. Magid, LA Times. This document was printed from the internet on Jun. 6, 1999 and bears a date of May 19, 1999.
Rogers, "Telcos vs. Cable TV : The Global View With Markets Converging and Regulatory Barriers Falling, Service Carriers Are Ready to Rumble," Data Communications, Sep. 21, 1995, vol. 24, No. 13, pp. 75-76, 78, 80, XP000526196.
Roizen, Joseph "Teletext in the USA," Society of Motion Picture and Television Engineers Journal, Jul. 1981, pp. 602-610.
Roseville City Council Presentation, Mar. 13, 1985 (Defendant's Exhibit 226).
Ross Peddicord, "New on TV: You Bet Your Horse," The Sun, Baltimore Maryland, Dec. 15, 1994, 1 pg.
Schlender, B.R., "Couch Potatoes! Now It's Smart TV," Fortune, Nov. 20, 1989, pp. 111-116.
Schmuckler, Eric "A marriage that's made in cyberspace (television networks pursue links with online information services)," May 16, 1994 MEDIAWEEK, v. 4, No. 20, p. 22(3).
Sealfon, Peggy, "High Tech TV," Photographic, Dec. 1984.
StarSight Interactive Television Program Guide III Jim Leftwich and Steve Schein, Functional/ Interactional Architecture Specification Document, Orbit Interaction, Palo Alto, California, Published before Apr. 19, 1995.
StarSight Interactive Television Program Guide IV, Jim Leftwich and Steve Schein, Functional/ Interactional Architecture Specification Document, Orbit Interaction, Palo Alto, California, Published before Apr. 19, 1995.
StarSight Interactive Television Program Guide, Jim Leftwich, Willy Lai & Steve Schein Published before Apr. 19, 1995.
Sunada, K. et al, "Teletext Color Television Receiver Model C-29M950, C26M940," NEC Home Electronics , NEC Giho, 1987.
Supplementary European Search Report for Application No. EP 98 93 5889, completed on Sep. 28, 2001.
Sussman, A. "GTE Tunes In to Home TV Shopping," PC Week, Jun. 28, 1988, p. C15.
Tech Notes: Product Updates from M/A-COM Cable Home Group, "Videocipher Owners Manual Update," Issue No. 6, Feb. 1986.
Technical White Paper, "Open TV™ Operating Environment," (© 1998 OpenTV Inc.), pp. 1-12.
Technological Examination & Basic Investigative Research Report on Image Databases, Japan Mechanical Engineering Organization Int'l Society for the Advancement of Image Software, Japan, Mar. 1988.
Technology: Turn on, tune in and print out—An experimental interactive television service is set to alter our viewing habits, Financial Times (London), Oct. 14, 1993, p. 11.
The New Media and Broadcast Policy: An Investigation & Research Conference Report on Broadcasting Diversification, Radio Regulatory Bureau, Japan Ministry of Posts & Telecommunications, Mar. 1982.
TV Guide Online Set for Fall, Entertainment Marketing Letter, Aug. 1994.
TV Listings Functional Spec., Time Video Information Services, Inc., undated.
Using StarSight 2, Instruction Manual, StarSight Telecast, Inc., Starsight CB 1500 Customer Letter, 1994.
Various publications of Insight Telecast, 1992 and 1993.
Veith, R.H., "Television's Teletext," Elsevier Science Publishing Co., Inc, 1983, pp. 13-20, 41-51.
Videocipher Stipulation, May 1996.
VideoGuide, "VideoGuide User's Manual," pp. 1-28 (p. 11 is the most relevant).
W. Leo Hoarty, "Multimedia on Cable Television Systems," Symposium Record Table TV Sessions, 18th International Television Symposium and Technical Exhibition, Montreux, Switzerland, Jun. 10, 1993, pp. 555-567.
Windows 98 Feature Combines TV, Terminal and the Internet, New York Times, Aug. 18, 1998.
Wittig et al, "Intelligent Media Agents in Interactive Television Systems," Proceedings of the International Conference on Multimedia Computing and Systems, Los Alamitos, CA, US, May 15-18, 1995, pp. 182-189, XP 000603484.
Yee Hsiang Chang et al., "An Open-Systems Approach to Video on Demand," IEEE Communications Magazine, May 1994, pp. 68-80.
"Advanced Analog Systems—Addressable Terminals, General Instrument Corp. of Horsham, Pennsylvania (URL:http--www.gi.com-BUSAREA-ANALOG-TERMINALWATCH-watch.html) Printed from the Internet on Mar. 4, 1999."
"DirecTV Digital Satellite Receiver—Operating Instructions, Sony Electronics Inc. (2001)."
"Ehrmantraut et al.," "The Personal Electronic Program Guide—Towards the Pre-Selection of Individual TV Programs,'"CIKM 96, Rockville, MD., Dec. 31, 1996, pp. 243-250."
"Partial European Search Report dated Feb. 22, 2010 from corresponding European Application No. EP 03 01 3370".
"SONICblue Incorporated: ReplayTV 4000 User Guide 12.17, Chapter Five: Networking, Sep. 10, 2001, retrieved from the internet: http://www.digitalnetworksna.com/support/replayTV/downloads/ReplayTV4000UserGuide.12.17.pdf."
A Financial Times Survey: Viewdata (Advertisement), Financial Times, Mar. 20, 1979.
ACM Multimedia 93 Proceedings, A Digital On-Demand Video Service Suporting Content-Based Queries, Little et al. pp. 427-436, Jul. 1993.
Armstrong, "Channel-Surfing's next wave: Henry Yuen's interactive TV guide takes on TCI and Viacom," BusinessWeek, Jul. 31, 1995.
Arnold, "Britain to get wired city—via telephone," Electronics, Mar. 4, 1976, at 76.
Blahut et al., "Interactive Television," Proceedings of the IEEE, Jul. 1995.
Boyd-Merritt, "Television wires two-way video," Electronic Engineering Times, Apr. 25, 1994.
CNN Tech: Sonicblue revives ReplayTV, articles cnn.com, Sep. 10, 2001, retrieved from the internet: http://articles.cnn.com/2001-09-10/tech/replay.tv.idg__1__replaytv-sonicblue-digital-video?__s=PM:TECH, 2 pages.
Day, "The Great PC/TV Debate," OEM Magazine, Jul. 1, 1996.
Dialing the printed page, ITT in Europe Profile, 11/Spring 1977.
DirecTV Plus2 System, Thompson Consumer Electronics, Inc. (1999).
DirecTV Receiver—Owner's Manual, Samsung, DirecTV, Inc. (2002).
DirecTV Receiver with TiVo Digital Satellite Receiver/Recorder SAT-T60—Installation Guide, Sony Electronics Inc. (2000).
DirecTV Receiver with TiVo Installation Guide, Philips, TiVo Inc. (2000).
DirecTV Receiver with TiVo Viewer's Guide, TiVo Inc., Sony Corp. (1999, 2000).
DishPro Satellite System—User's Guide, Dish Network (Sep. 1, 2001).
Electronic Program Guide via Internet, Research Disclosure, Kenneth Mason Publications, Hampshire, GB vol. 385(2) (May 1996) p. 276, ISSN:0374-4353.
EP Search Report EP 06076553 Oct. 24, 2006 (Orig. UV/015 DIV 2).
Fall 2001 TiVo Service Update with Dual Tuner!, TiVo Inc. (2001).
Growing US interest in the impact of viewdata, Computing Weekly, Jul. 20, 1978.
Holland, "NAPLPS standard defines graphics and text communications," EDN, Jan. 10, 1985, at 179.

(56) References Cited

OTHER PUBLICATIONS

Iitusuka, Honbashi, Kuwana, Building Internet TV Guide Service 1 and 2, the 53rd National Conference Proceedings, Japan, Information Processing Society of Japan, Sep. 6, 1996 p. 3-227 to 230. [resubmit with english translation].
Keith Lynch's timeline of net related terms and concepts, Mar. 22, 2007.
Large, "Viewdata, the invention that brings boundless advice and information to the home, also sets a test for the Post Office," Financial Guardian, Jun. 29, 1978.
Large, Peter, "Throw away the books—Viewdata's coming," Guardian, Jan. 10, 1978.
Leftwich, Jim & Schein, Steve, StarSight Interactive Television Program Guide, Phase III, Functional/Interactional Architecture Specification Document, Orbit Interaction, Palo Alto, California.
Leftwich, Jim, Lai, Willy & Schein, Steve, StarSight Interactive Television Program Guide, Phase IV, Functional/Interactional Architecture Specification Document, Orbit Interaction, Palo Alto, California, published before Apr. 19, 1995.
Lloyd, "Impact of technology," Financial Times, Jul. 1978.
Miller, "A Scenario for the Deployment of Interactive Multimedia Cable Television Systems in the United States in the 1990s," IEEE, 1994.
Money, "Teletext and Viewdata," Butterworth & Co. Ltd., London, 1979.
Owen, "How dial-a-fact is coming closer to home," The Times, Sep. 30, 1977.
Owen, "Why the Post Office is so excited by its plans for a TV screen information service," The Times, Sep. 26, 1976.
Poole, "Demand for Viewdata grows," Sunday Times, Feb. 10, 1977.
PTV Recorder Setup Guide, Philips Electronics, TiVo Inc. (2000).
Qayyum, "Using IVDS and VBI for Interactive Television," IEEE, Jun. 10, 1996.
Rath et al., "Set-Top Box Control Software: A Key Component in Digital Video," Philips Journal of Research, vol. 50, No. 1/2 1996, at 185.
RCA Satellite Receiver User's Guide, Thomson Multimedia Inc. (2001).
Rosch, "New data and information system set for commercial market trial," Telephony, Mar. 20, 1978, at 96.
Ryan, "Interactive TV Takes a Corporte Twist," Electronic Engineering Times, Jul. 10, 1995.
Schauer: Internet Article, [Online] Sep. 28, 1995, XP002378870, Retrieved from the Internet: URL: www.vision2020.moscow.com/Archives/1995/9509/0058.htlm> [retrieved on Apr. 28, 2006] *the whole document*.
Selected pages from the "BBC Online—Schedules" web page. This web page is located at http://www.bbc.co.uk/schedules/ (as printed from the Internet on Oct. 19, 1999 and being dated as early as May 24, 1997).
Sharpless et al., "An advanced home terminal for interactive data communication," Conf. Rec. Int. Conf. Commun. ICC '77, IEEE, Jun. 12-15, 1977, at 19.6-47.
St. John Sandringham, "Dress rehearsal for the PRESTEL show," New Scientist, Jun. 1, 1978, at 586.
Start Here, Sony, TiVo and DirecTV (undated).
Statement in an Examination Report dated Aug. 2, 1999 for a counterpart foreign application filed in New Zealand in which the foreign Examiner alleges that he has used "the Internet to access television listings for BBC World television as far back as mid 1996 . . . ".
Stickland, D.C., "It's a common noun," The Economist, Jun. 5, 1978.
Stokes, "The viewdata age: Power to the People," Computing Weekly, Jan. 1979.
Teletext presents the alternative view, Financial Times, Oct. 24, 1977.
The television program guide website of Gist Communications, Inc. of New York, New York. This website is located at www.gist.com (as printed from the Internet on Aug. 14, 1997).
The television program guide website of TV Guide Entertainment Network. This website is located at www.tvguide.com (as printed from the Internet on Aug. 14-22, 1997).
Three men on a Viewdata bike, The Economist, Mar. 25, 1978.
TV Guide movie database Internet web pages printed on Aug. 12, 1999 (9 pages).
User's Guide RCA Color TV with TV Plus+Guide, Thomson Consumer Electronics(1997).
UVSG Offers System-Specific Web Site Development for OPS, press release of United Video Satellite Group, Apr. 12, 1996.
UVSG Teams With Microsoft on Internet Information Server, press release of United Video Satellite Group, Feb. 22, 1996.
Viewdata and its potential impact in the USA: Final Report/Volume One, The UK Experience, Link and Butler Cox & Partners Limited, Oct. 1978.
Viewdata moves in US but GEC may lose out, Computing Weekly, Jan. 25, 1978.
Web TV and Its Consumer Electronics Licenses debut First Internet Television Network and Set.
Top Box XP 002113265 Retrieved from the Internet: <URL http://www.webtv.net/company/news/archive/License.html> 'retrieved on Aug. 25, 1999 .
Whitehorn, "Viewdata and you," Observer, Jul. 30, 1978.
Wikipedia article on CompuServe, Mar. 22, 2007.
Yoshida, "Interactive TV a Blur," Electronic Engineering Times, Jan. 30, 1995.

\* cited by examiner

| PREFERENCE ATTRIBUTE | PREFERENCE LEVEL |
|---|---|
| COMEDY | STRONG LIKE |
| DISNEY CHANNEL | WEAK LIKE |
| HORROR | WEAK DISLIKE |
| ARNOLD SCHWARZENEGGER | STRONG DISLIKE |
| CLOSED-CAPTIONED | MANDATORY |
| R RATING | ILLEGAL |
| ENGLISH | MANDATORY |
| TV-MA RATING | ILLEGAL |
| NC-17 RATING | ILLEGAL |
| SCOPE - LIKES ONLY | |

| NARROW SCOPE | MODERATE SCOPE | WIDE SCOPE | TITLE | GENRE | CC | RATING | MANDATORY+ NOT ILLEGAL | HIGHEST LEVEL |
|---|---|---|---|---|---|---|---|---|
| Y | Y | Y | SEINFELD | COMEDY | Y | TV-PG | Y | SL |
| N | N | Y | THE SHINING | HORROR | Y | PG-13 | Y | WD |
| N | N | N | DANTE'S PEAK | COMEDY | Y | R | N | SL |
| N | N | N | NIGHT AT THE OPERA | COMEDY | N | G | N | SL |
| N | Y | Y | ER | DRAMA | Y | TV-PG | Y | NEUTRAL |
| N | N | Y | TERMINATOR | ACTION HORROR | Y | PG-13 | Y | SD |
| Y | Y | Y | MY STEPMOTHER IS AN ALIEN | COMEDY HORROR | Y | PG-13 | Y | SL+WD |

*FIG. 9*

| PROFILE NO. 1 | PROFILE NO. 2 | PROFILE NO. 3 |
|---|---|---|
| SEINFELD SL | ESPN WL | CRITICS |
| COMEDY SL | HOCKEY SL | RATING SL |
| HORROR SD | SAP WL | ABOVE 3★ |
| RERUNS WD | COMEDY WL | MOVIES SL |
| "BOND" SL | | SPORTS SD |
| | | PAY-PER-VIEW WL |
| SCOPE = NARROW | SCOPE = MODERATE | SCOPE = NARROW |

| TIME | CH | TITLE |
|---|---|---|
| 9:00 PM | 4 | SEINFELD |
| 10:00 PM | 2 | DANTE'S PEAK |
| 10:00 PM | 7 | ER |

PROFILE  ◁ MIKE ▷

SCOPE  ◁ ONLY LIKES ▷

FIG. 19

| TIME | CH | TITLE |
|------|----|----|
| 10:00 PM | 4 | DANTE'S PEAK |
| 10:00 PM | 5 | NEWS |
| 10:00 PM | 7 | ER |

PRESS FAV

| TIME | CH | TITLE | |
|---|---|---|---|
| 9:00 PM | 4 | SEINFELD | M |
| 10:00 PM | 4 | DANTE'S PEAK | M |
| 10:00 PM | 5 | NEWS | |
| 10:00 PM | 7 | ER | J M |
| 10:00 PM | 9 | FOOTBALL | J |

RED (rows 1–2)
RED (row 3)
GREEN (rows 4–5)

FIG. 24

| TIME | CH | TITLE |
|---|---|---|
| | | HOT LIST 9:05 PM |
| 9:00 PM | REQ 1 | TERMINATOR |
| 9:00 PM | 4 | SEINFELD |
| 11:00 PM | 5 | NEWS [R] |

FIG. 25

```
                    PERSONAL IDENTIFICATION NUMBER SETUP
                                              ─ 244
                    PROFILE   ⟨JOEY⟩
                    PIN: [ * * * * ] ← 246
                    PIN REQUIRED FOR:

248 ─────── ACTIVATING PROFILE                    Y  [N]
250 ─────── DEACTIVATING PROFILE                  [Y]  N
252 ─────── VIEWING PROFILE ATTRIBUTES            Y  [N]
254 ─────── ADDING, DELETING, OR CHANGING
            ILLEGAL ATTRIBUTES                    [Y]  N
256 ─────── ADDING, DELETING, OR CHANGING
            MANDATORY ATTRIBUTES                  [Y]  N
258 ─────── ADDING, DELETING, OR CHANGING
            LIKES AND DISLIKES                    Y  [N]
```

*FIG. 28*

MASTER PROFILE

| | |
|---|---|
| R RATING | ILLEGAL |
| ENGLISH | MANDATORY |

PROFILE JOEY

| | |
|---|---|
| COMEDY | STRONG LIKE |
| R RATING | MANDATORY |
| ⋮ | ⋮ |

```
PROFILE
PROFILE NAME: MIKE

PROGRAM SETTINGS
| COMEDY  | STRONG LIKE |
| ENGLISH | MANDATORY   |
|   ⋮     |    ⋮         |
| SCOPE - MODERATE       |

NON-PROGRAM SETTINGS

AUDIO
    DOLBY    ON ◁▷ OFF                    ◀── 268
    STEREO   ON ◁▷ OFF
        ⋮
    DISPLAY
    BRIGHTNESS      ◁HIGH ▷               ◀── 270
    TEXT LANGUAGE   ◁FRENCH▷
        ⋮
        ⋮
```

PROGRAM GUIDE SYSTEM WITH PREFERENCE PROFILES

CROSS REFERENCE TO RELATED APPLICATIONS

This application is a continuation of U.S. patent application Ser. No. 11/894,609, filed Aug. 20, 2007, which is a continuation of U.S. patent application Ser. No. 11/704,736, filed Feb. 9, 2007, now abandoned, which is a continuation of U.S. patent application Ser. No. 09/034,934, filed Mar. 4, 1998, now U.S. Pat. No. 7,185,355, issued Feb. 27, 2007, each of which is hereby incorporated by reference herein in its entirety.

BACKGROUND OF THE INVENTION

This invention relates to interactive television program guides, and more particularly, to television program guides in which users may create profiles of their programming preferences. Profiles contain information about the user's interests (e.g., favored or disfavored programming genres, actors, channels, series, etc.) The profiles are used by the program guide in determining which channels the user may tune to and which programs are to be included in various lists displayed by the guide.

Cable, satellite, and broadcast television systems provide viewers with a large number of television channels. Viewers have traditionally consulted printed television program schedules to determine the programs being broadcast at a particular time. More recently, interactive electronic television program guides have been developed that allow television program information to be displayed on a viewer's television.

Interactive program guides are typically implemented on set-top boxes. Such program guides allow users to view television program listings in different display formats. For example, a user may instruct the program guide to display a grid or table of program listings organized in a channel-ordered or a time-ordered list. Users may also search and sort program listings by genre (e.g., movies, sports, etc.) or by title (i.e, alphabetically). A user may obtain additional information for a program by placing a highlight region on a desired program listing and pressing an "info" button. The user may purchase a pay program from the program guide by placing the highlight region on a program listing and pressing an "OK" button. Some systems allow the user to select a program for recording by placing the highlight region on a program listing and pressing a "record" button.

Because there are so many television channels available, particularly with cable and satellite television systems, television program guides have been developed that allow users to establish lists of favorite channels. When a user is channel surfing, the set top box on which the program guide is implemented can be directed to tune only to channels contained in the favorite channel list. When the user directs the program guide to display current or future programming, the displayed list of programs is restricted to television programs that occur only on the user's preselected favorite channels.

This approach is not very selective. Even though a user may have chosen a channel as a favorite, some of the programming that appears on that channel may not be of interest to the user. Moreover, programs that would be of interest to the user often appear on channels that the user has not chosen as favorites (e.g., because the user does not like most of the programming on those channels).

What is needed is a more sophisticated way in which a user may inform a program guide of the user's preferences, so that the program guide can more accurately filter out disliked programming while retaining more programming of the type the user likes.

It is therefore an object of the present invention to provide a program guide system with which a user may set up a profile based on various preference attributes.

SUMMARY OF THE INVENTION

These and other objects of the invention are accomplished in accordance with the principles of the present invention by providing an interactive television program guide system in which a user may inform a program guide of the user's television programming interests. The user may specify a number of preference attributes such as program title, genre, start time, broadcast characteristics, language, rating, critics ratings, actor, etc. Each preference attribute has an associated preference level that is indicative of the user's interest in that attribute. Suitable preference levels include: strong like, weak like, strong dislike, weak dislike, illegal, mandatory, and don't care.

The program guide may maintain the preference attributes and associated preference levels for a user in a preference profile. Different preference profiles may be used by different users of the same program guide. If desired; more than one preference profile may be active at a given time.

The program guide may use the preference profiles when displaying lists of available television programming. Only those programs that satisfy the preference profile will be displayed by the program guide, even if other programs are available. Another way in which the program guide may use the preference profiles is to restrict the programs to which the user may tune with the system to only those programs that satisfy the profile.

A user may define a preferred sort order for programs that satisfy the profile. The user may also specify a desired preference scope. A narrow scope may be used to restrict programming choices to programs that are liked, whereas a wide scope may be used to restrict programming choices to programs that are just not disliked.

The user may direct the program guide to require a personal identification number (PIN) in order to access certain profile modification options. Such personal identification number access control may be used by parents to control the television viewing of their children.

A master profile may be used that has settings that override the settings in other profiles.

Profiles may contain non-program settings for controlling audio and display options in the system.

Further features of the invention, its nature and various advantages will be more apparent from the accompanying drawings and the following detailed description of the preferred embodiments.

BRIEF DESCRIPTION OF THE DRAWINGS

FIG. 7 is a diagram of an illustrative preference profile containing multiple preference attributes and their associated preference levels and an associated preference scope in accordance with the present invention.

FIG. 8 is a table illustrating the titles, genres, closed-caption status, and ratings associated with a number of programs and illustrating which groups of these programs would satisfy the profile of FIG. 7 with various different preference scopes in accordance with the present invention.

FIG. 9 is a diagram illustrating how multiple profiles may be used and how a given preference attribute may be associated with more than one such profile in accordance with the present invention.

FIG. 19 is an illustrative by-time favorites list display in accordance with the present invention.

FIG. 22 is a diagram of a program listings screen illustrating the restricted highlight movement mode in accordance with the present invention.

FIG. 24 is an illustrative program listings screen showing how programs that satisfy different preference profiles can be listed with different colors, patterns, or icons in accordance with the present invention.

FIG. 25 is an illustrative hot list in accordance with the present invention.

FIG. 28 is an illustrative personal identification number setup screen in accordance with the present invention.

FIG. 29 is a diagram illustrating the concurrent use of both a master profile and another profile in accordance with the present invention.

FIG. 31 is a diagram illustrating how both program settings and non-program settings may be associated with a given preference profile in accordance with the present invention.

DETAILED DESCRIPTION OF THE PREFERRED EMBODIMENTS

Figure 1:
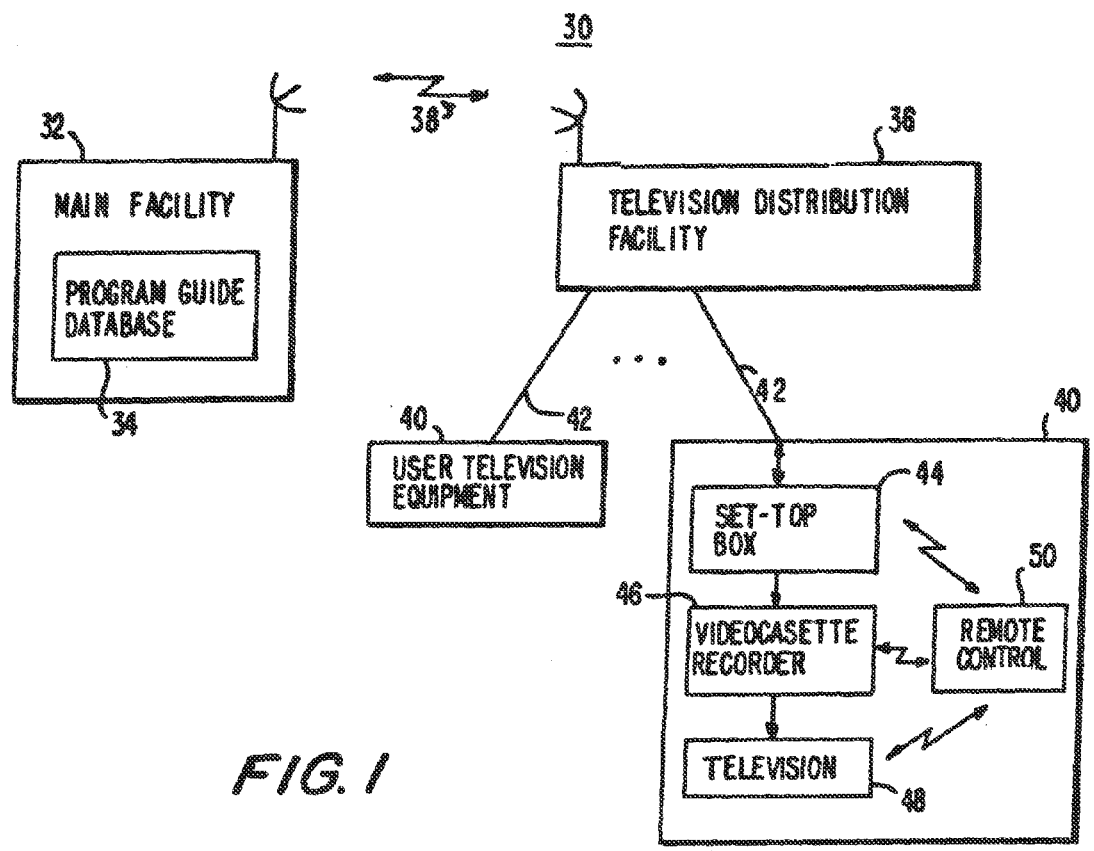
FIG. 1 is a diagram of a system in which an interactive television program guide is implemented in accordance with the present invention.

An illustrative program guide system 30 in accordance with the present invention is shown in FIG. 1. Main facility 32 contains a program guide database 34 for storing program guide information such as television program guide listings data, pay-per-view ordering information, television program promotional information, etc. Information from database 34 may be transmitted to television distribution facility 36 via communications link 38. Link 38 may be a satellite link, a telephone network link, a cable or fiber optic link, a microwave link, a combination of such links, or any other suitable communications path. If it is desired to transmit video signals over link 38 in addition to data signals, a relatively high bandwidth link such as a satellite link is generally preferable to a relatively low bandwidth link such as a telephone line.

Television distribution facility 36 is a facility for distributing television signals to users, such as a cable system headend, a broadcast distribution facility, or a satellite television distribution facility.

The program guide information transmitted by main facility 32 to television distribution facility 36 includes television program listings data for current and future television programs. The television program listings data for each program preferably includes the title of the program, the channel for the program, a scheduled broadcast time (start time) and an ending time (or duration). Other typical program listings data include ratings, critics ratings, descriptions, genres (sports, movies, children, etc.), actors, etc. Transmitted program information may also include advertising information and pay program data such as pricing information for individual programs and subscription channels, time windows for ordering programs and channels, telephone numbers for placing orders that cannot be impulse ordered, etc.

Television distribution facility 36 distributes television programming and program guide information to the user television equipment 40 of multiple users via communications paths 42. For example, television programming may be distributed over analog television channels and program guide data may be distributed over an out-of-band channel on paths 42. Data distribution may also involve using one or more digital channels on paths 42. Such digital channels may also be used for distributing television programming and other information. Multiple television and audio channels (analog, digital, or both analog and digital) may be provided to set-top boxes 44 via communications paths 42. If desired, program listings and other information may be distributed by one or more distribution facilities that are similar to but separate from television distribution facility 36 using communications paths that are separate from communications paths 42.

Certain functions such as pay program purchasing may require set-top boxes 44 to transmit data to television distribution facility 36 over communications paths 42. If desired, such data may be transmitted over telephone lines or other separate communications paths. If functions such as these are provided using facilities separate from television distribution facility 36, some of the communications involving set-top boxes 44 may be made directly with the separate facilities.

Each user has a receiver, which is typically a set-top box such as set-top box 44, but which may be other suitable television equipment into which circuitry similar to set-top-box circuitry has been integrated. Program guide data is distributed to set-top boxes 44 periodically. Television distribution facility 36 may also poll set-top boxes 44 periodically for certain information (e.g., pay program account information or information regarding programs that have been purchased and viewed using locally-generated authorization techniques). Main facility 32 preferably contains a processor to handle information distribution tasks. Each set-top box 44 preferably contains a processor to handle tasks associated with implementing a program guide application on the set-top box 44. Television distribution facility 36 may contain a processor for tasks associated with monitoring a user's interactions with the interactive program guide implemented on set-top boxes 44 and for handling tasks associated with the distribution of program guide data and other information to user television equipment 40.

Each set-top box 44 is typically connected to an optional videocassette recorder 46 so that selected television programs may be recorded. Each videocassette recorder 46 is connected to a television 48. To record a program, set-top box 44 tunes to a particular channel and sends control signals to videocassette recorder 46 (e.g., using an infrared transmitter) that direct videocassette recorder 46 to start and stop recording at the appropriate times.

During use of the interactive television program guide implemented on set-top box 44, television program listings and other information may be displayed on television 48. Such program guide displays may be presented on top of a television program to which the user has tuned with set-top box 44 or may be presented in place of such a program. Each set-top box 44, videocassette recorder 46, and television 48 may be controlled by one or more remote controls 50 or any other suitable user input interface such as a wireless keyboard, mouse, trackball, dedicated set of buttons, etc. Remote controls such as remote control 50 have various buttons that may be pressed by the user such as cursor keys (for on-screen movement of a highlight region, scrolling functions, etc.), an enter key (for making a selection), channel number keys (for selecting a television channel), a favorites key (to invoke functions related to user preferences), etc.

Because television viewers sometimes feel overwhelmed by the large number of programming choices that are available, particularly with modern cable and satellite systems, the present invention allows users to inform the program guide of their programming preferences. The program guide may then tailor its operation to reflect the user's programming interests.

For example, a user may inform the program guide that the user likes the program Seinfeld and the programming genre "movies," but dislikes the actor John Wayne. The program guide can use these preferences to limit the amount of material that is presented to the user (e.g., when generating lists of television program choices or when deciding which channels to allow the user to tune to with the set-top box). The different types of television program characteristics that a user may indicate a preference about are referred to herein as preference attributes.

Each preference attribute may have an associated preference level. For example, users may indicate whether a preference attribute is liked, disliked, illegal, mandatory or don't care (neutral). The degree to which a user likes or dislikes certain preference attributes may also be specified. For example, the user may indicate that the preference level associated with the preference attribute of the genre sports is a strong like and that the preference level associated with the preference attribute of the actor John Wayne is a weak dislike.

The program guide implemented on set-top box 44 provides various options that allow the user to specify which different preference attributes are to be used in presenting television program listings information to the user. Such options may be provided in the form of clickable menu items, drop-down lists, or any other suitable format. The user may select a desired menu item using a highlight region, cursor, arrow, or other suitable on-screen indicator that may be positioned over an option on the display (i.e., television 48). For example, a user may position a highlight region over a desired menu item and press "OK" on remote control 50 to complete the selection. Selections that involve entering characters may be made by selecting characters from characters displayed on screen (e.g., using cursors to move through the alphabet) or by using a wireless keyboard or other alphanumeric entry device.

Figure 2A:
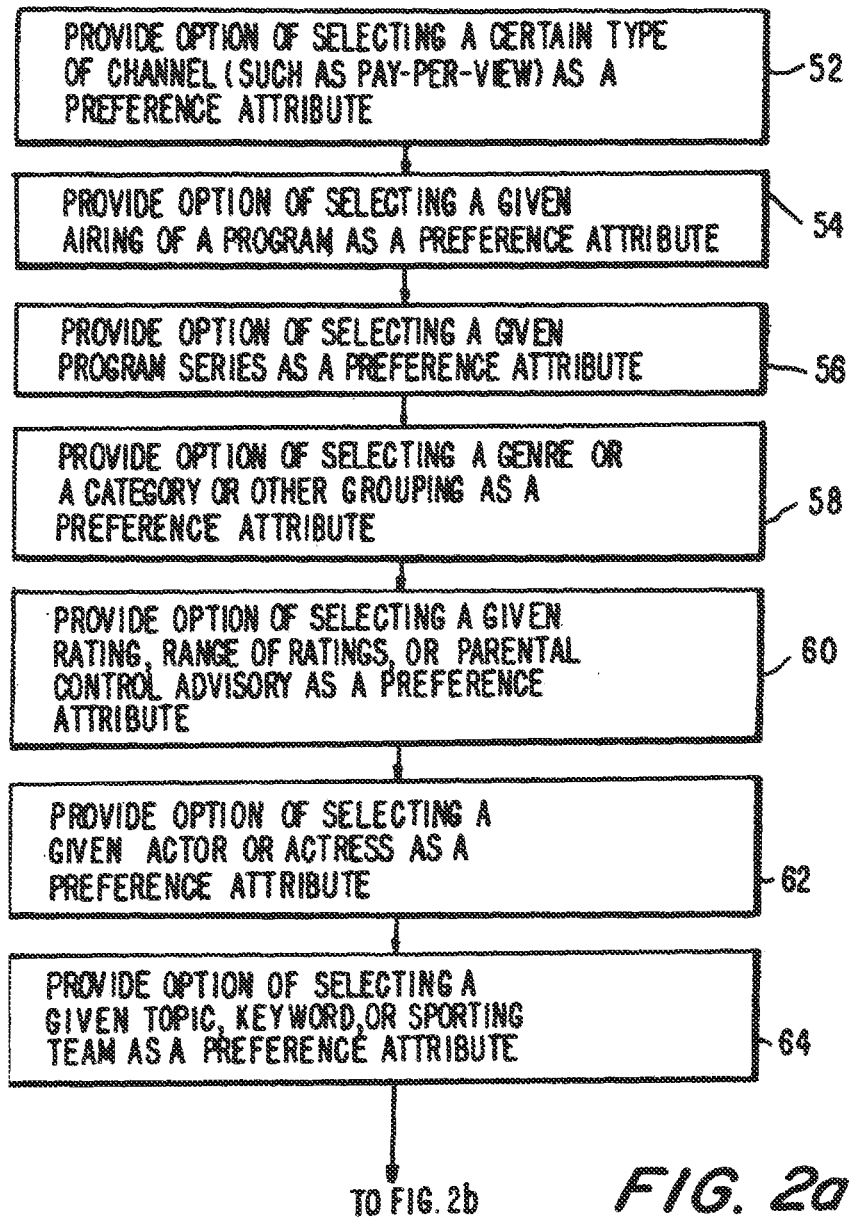
FIGS. 2a and 2b are flow charts of steps involved in providing options for selecting various preference profile attributes in accordance with the present invention.
Figure 2B:
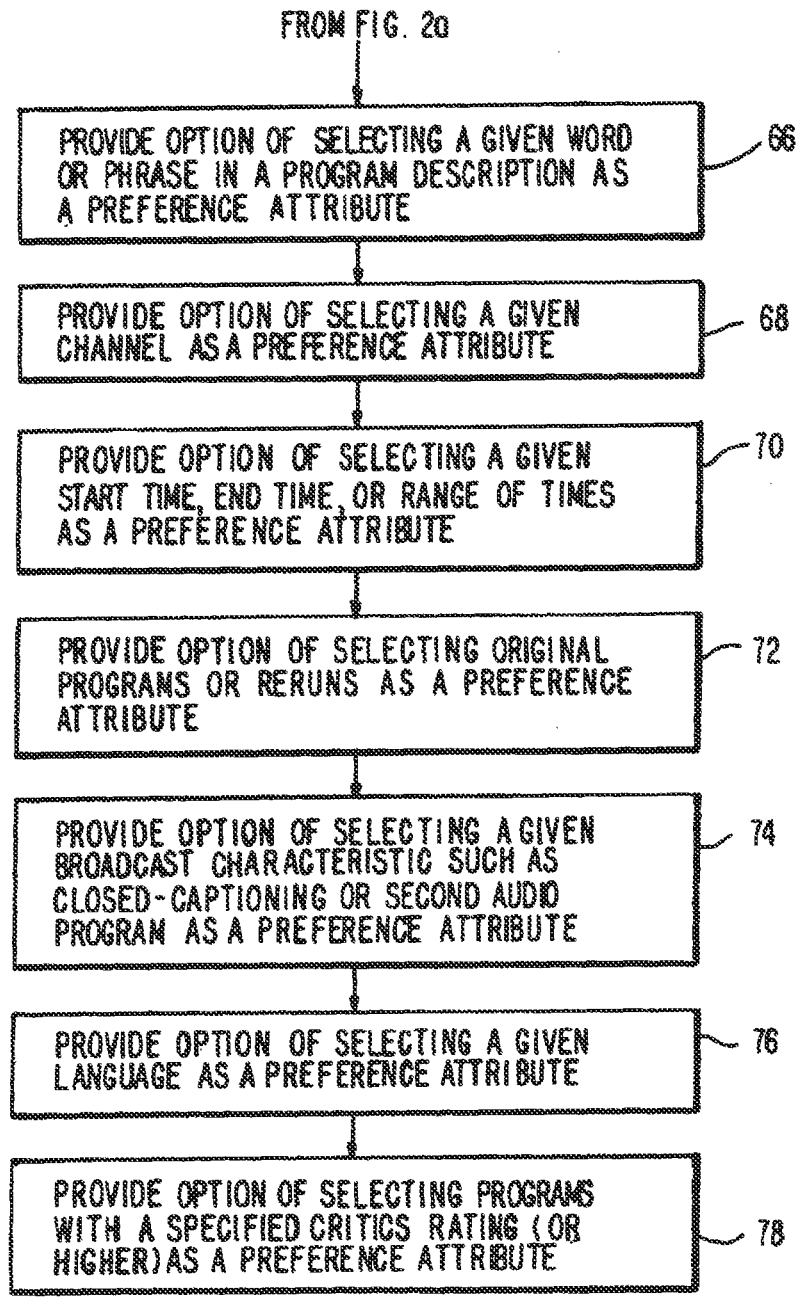

Steps that are involved in providing preference attribute options with the program guide are shown in FIGS. 2a and 2b. At step 52 of FIG. 2a, the program guide may provide the user with the option of selecting a certain type of channel (such as the pay-per-view channel type) as a preference attribute. This feature allows a user to express an interest in, e.g., pay-per-view programming without requiring the user to individually select or even know the names of all of the pay-per-view channels that are available.

At step 54, the program guide may provide the user with the option of selecting a given airing of a program as a preference attribute. For example, if the user wishes to watch the next broadcast of the program Seinfeld at 9:00 on Thursday, the user may select that broadcast of Seinfeld as a preference attribute and may indicate that the selection has a preference level of "strong like." This effectively allows the user to use the indicated preference as a reminder (e.g., in situations in which the program guide has been configured to present an on-screen reminder of all upcoming programs that satisfy the user's selected preferences).

At step 56, the program guide may provide the user with the option of selecting a given program series as a preference attribute. For example, the user could indicate an interest in the Seinfeld series. When the user directs the program guide to present a list of available programs, the programs that are listed will include those in the Seinfeld series (unless a conflicting preference prevents such a program from being listed).

At step 58, the program guide may provide the user with the option of selecting as a preference attribute a program genre (category) or other suitable grouping (e.g., all programs aired on Sundays, etc.—that are not in a traditional genre, but that are in some way related). For example, the genre (which may be a subgenre) may be sports, children's programming, news, weather, movies, action, horror, baseball, football, comedy, etc.

At step 60, the program guide may provide the user with the option of selecting a rating (G, PG, TV-Y, etc.), a range of ratings (e.g., the R rating and all ratings for more mature audiences), or a parental control advisory (e.g., this program contains strong language, etc.) as a preference attribute.

At step 62, the program guide may provide the user with the option of selecting an actor or actress as a preference attribute.

At step 64, the program guide may provide the user with the option of selecting a topic (e.g., cooking, photography, music, painting), keyword (e.g., cooks, etc.), or sporting team as a preference attribute.

As shown in FIG. 2b, at step 66 the program guide may provide the user with the option of selecting a given word or phrase in a program description as a preference attribute. The program guide may search all program descriptions for the presence of the selected word or phrase when determining whether a program satisfies the user's preference criteria.

At step 68, the program guide may provide the user with the option of selecting a channel as a preference attribute.

At step 70, the program guide may provide the user with the option of selecting a start time (e.g., a scheduled broadcast time), an end time, or a range of broadcast times as a preference attribute. This feature may be used for parental control by restricting the viewing times available for children.

At step 72, the program guide may provide the user with the option of selecting original (or rerun) programs as a preference attribute.

At step 74, the program guide may provide the user with the option of selecting a given broadcast characteristic such as closed-captioning or secondary audio as a preference attribute.

At step 76, the program guide may provide the user with the option of selecting a language as a preference attribute.

At step 78, the program guide may provide the user with the option of selecting a certain critics rating (e.g., three stars, or three stars or greater, etc.) as a preference attribute.

The steps involved in providing the preference attribute selection options shown in FIGS. 2a and 2b are illustrative only and the program guide may provide the user with the option of selecting any other suitable preference attributes if desired. Moreover, the order of the steps shown in FIGS. 2a and 2b is not important. Typically, several such options are provided at the same time (e.g., on the same menu screen).

Figure 3:
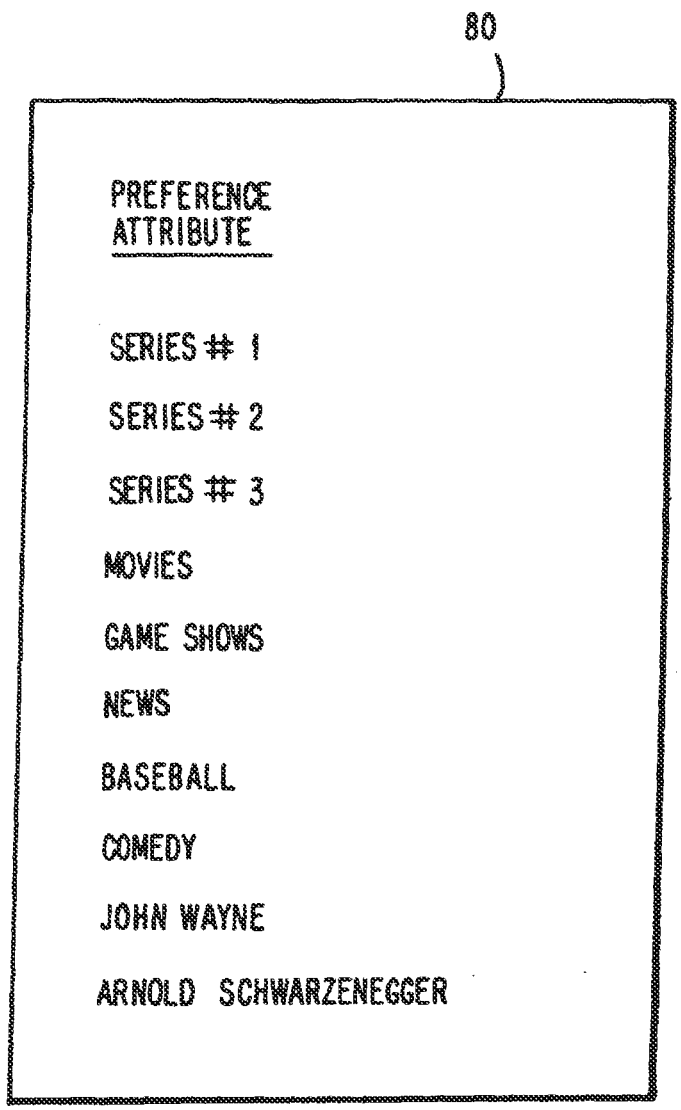
FIG. 3 is a diagram of an illustrative preference profile showing how multiple preference attributes of the same type may be associated with the same preference profile.

The preference attributes the user selects may be organized in a profile (sometimes called a preference profile or a favorites profile). If there are several users (e.g., different family members) associated with a given program guide, each user may have his own profile. A profile may contain more than one preference attribute of the same type. For example, preference profile 80 of FIG. 3 has three series preference attributes (series Nos. 1, 2, and 3), four genre preference attributes (movies, game shows, news, baseball, and comedy), and two actor preference attributes (John Wayne and Arnold Schwarzenegger).

If desired, the user may specify a priority or sort order in which programs satisfying the preference criteria in a profile are to be displayed or tuned to. When listing or tuning to programs that satisfy a profile, the programs matching the highest priority preference attributes may be tuned to (with set-top box 44) or listed (on the display of television 48) first. This feature is particularly useful when a user wishes to further simplify the process of selecting programs of interest.

Figure 4:
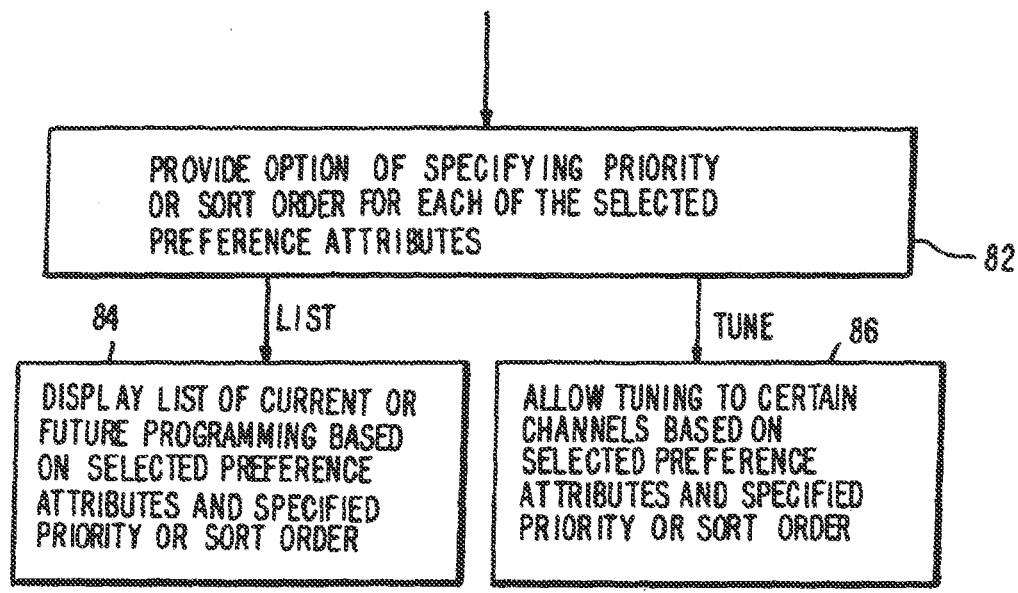
FIG. 4 is a flow chart showing steps involved in using the program guide with a specified sort order in accordance with the present invention.

FIG. 4 shows how the program guide provides the user with the option of specifying the sort order (i.e., priority) for each of the selected preference attributes at step 82. If the user chooses to list programs satisfying the profile criteria, the program guide may display a list of the current or future programs based on the selected preference attributes and the specified sort order at step 84. If the user chooses to use the profile to limit the channels that may be tuned to, rather than displaying a list of results, the program guide may allow tuning to channels and programs based on the selected preference attributes in the profile and the specified sort order at step 86.

Figure 5:
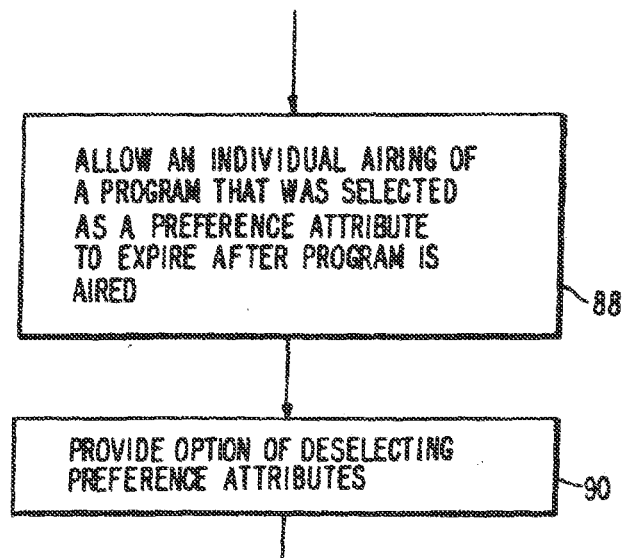
FIG. 5 is a flow chart of steps involved in allowing a selected preference attribute to expire or be deselected in accordance with the present invention.

When a user selects an individual showing of a program as part of a preference profile, the program guide will allow that selection to expire at the end of the program. This is shown as step 88 in FIG. 5. The program guide may allow preference attributes that have been selected by the user to remain valid until deselected by the user (step 90).

Figure 6:
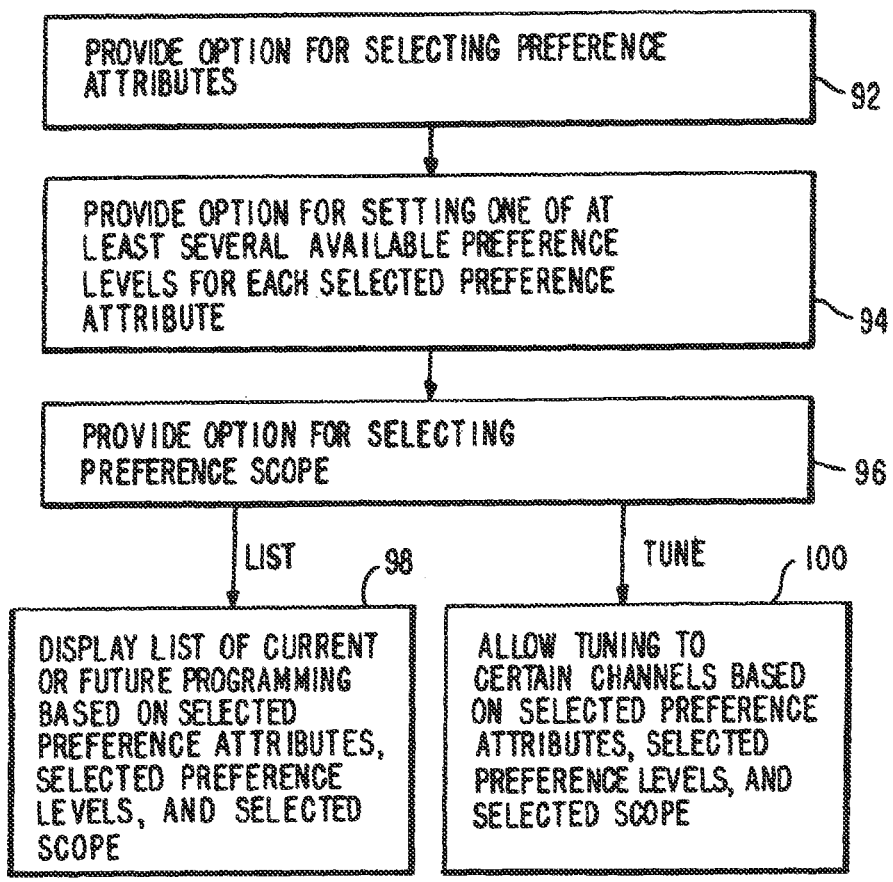
FIG. 6 is a flow chart of steps involved in using the program guide with various preference scopes in accordance with the present invention.

Preference levels that may be used to indicate the user's interest or disinterest in a given preference attribute include strong like, weak like, strong dislike, or weak dislike, mandatory (appropriate, e.g., for closed-captioning for a deaf person), illegal (appropriate for R-rated programs for a child) and don't care (neutral). As shown in FIG. 6, after the program guide provides the user with an opportunity (option) for selecting preference attributes at step 92, the program guide provides an option that allows the user to set one of at least several available preference levels for each selected preference attribute at step 94.

The program guide also allows the user to specify a preference scope at step 96. Each profile may have a separate associated preference scope. The preference scope is used to determine which programs that match the preference criteria in the profile will be displayed (or used when tuning). If the user opts to display a list of programs based on a preference profile, the program guide may display a list of current or future programming based on the selected preference attributes, selected preference levels, and preference scope that are associated with the profile at step 98. If the user opts to have the program guide restrict the user's tuning options based on the preference profile, the program guide may allow tuning to certain channels or programs based on the selected preference attributes, selected preference levels, and the selected preference scope that are associated with the profile at step 100. The program listings information that is used by the program guide in displaying the list of programs or in controlling the tuning of the set-top box is the program listings data provided to the program guide by the television distribution facility.

An illustrative preference profile 102 containing a number of preference attributes 104, associated preference levels 106, and an associated preference scope 108 is shown in FIG. 7. FIG. 8 is a table containing an illustrative list of programs that might be available to the user (under the title column). The results that appear under the columns labeled "narrow scope," "moderate scope," and "wide scope" show which programs (from the titles column) satisfy the preference attributes and preference levels of profile 102 (FIG. 7).

When the user selects the widest scope in the example of FIG. 8, the program guide lists (or allows tuning to) programs that have all mandatory attributes and no illegal attributes. For example, Seinfeld is included in the widest preference scope because Seinfeld has the only mandatory attribute that is specified in profile 102 of FIG. 7—closed-captioning. In addition, Seinfeld has no preference attributes with a preference level of illegal (R rating, TV-MA rating, or NC-17 rating). The Night at the Opera is not included because it does not have a mandatory attribute (closed-captioning). Dante's Peak is not included because it has a illegal rating (R).

When the user selects the moderate scope in the example of FIG. 8, the program guide lists (or allows tuning to) programs that have no preference attributes with an associated preference level of disliked and that have all mandatory attributes and no illegal attributes. The program Terminator is not within the moderate scope example of FIG. 8 because the preference attribute of horror in profile 102 of FIG. 7 has an associated preference level of "weak dislike" and the preference attribute of Schwarzenegger (an actor in the program Terminator) has an associated preference level of "strong dislike." When faced with two different preference levels associated with the same program, the program guide uses the stronger of the two (in this case "strong dislike"). The program ER is included within the moderate scope example of FIG. 8 because it does not have any disliked attributes.

When the user selects the narrow preference scope in the example of FIG. 8, the program guide lists (or allows tuning to) all liked programs that are not more disliked and that have all mandatory attributes and no illegal attributes. The program ER is not within the narrow scope example, because it does not have any liked attributes.

The program guide allows multiple profiles to be used. For example, different users (e.g., different family members who share user television equipment 40) may each have their own profile. One profile maybe used for children. Another profile may be used for children when watching television with their parents (who can supervise). A profile may be created for each adult. Another profile may be created for adults to use when watching television together.

An illustrative set of profiles is shown in FIG. 9. Profile No. 1 belongs to a first user who has a strong like for the program Seinfeld, a strong like for the genre comedy, a strong dislike for the genre horror, a weak dislike for reruns, and a strong like for programs containing the text string "Bond." The first user has selected a narrow preference scope. Profile No. 2 belongs to a second user who has a weak like for the ESPN channel, a strong like for the genre hockey, a weak like for the broadcast characteristic second audio program (SAP), and a weak like for comedy. The second user has selected a moderate preference scope. Profile No. 3 belongs to a third user who has a strong like for programs with a critics rating of three stars or more, a strong like for the genre movies, a strong dislike for the genre sports, and a weak like for pay-per-view programs. The third user has selected a preference scope of narrow.

Although each profile has its own independent set of preference attributes, any given attribute may be in more than one profile. For example, the attribute comedy appears in both profile No. 1 and profile No. 2.

Figure 10:
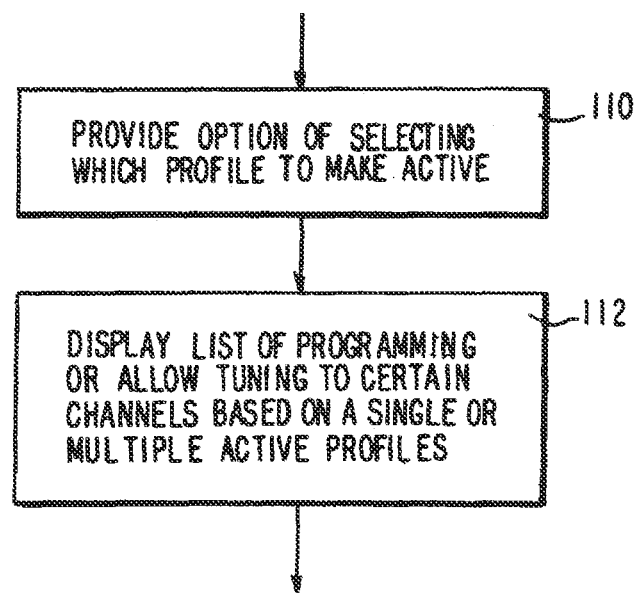
FIG. 10 is a flow chart of steps involved in selecting a profile to make active and displaying programming or allowing tuning based on one or more active profiles in accordance with the present invention.

When a user desires to use the program guide, the user may activate an appropriate profile. As shown in FIG. 10, the program guide provides users with the option of selecting which profile to make active at step 110. More than one profile may be active at a given time. If a single profile is made active at step 110, the program guide displays lists of programming or allows tuning to certain channels or programs based on that single active profile at step 112. If multiple profiles are made active at step 110, the program guide displays lists of programming or allows tuning to certain channels or programs based on the multiple profiles that are active at step 112.

When multiple profiles are used at the same time, the program guide resolves conflicts between profiles. For example, if one profile indicates that comedy is a strong like and another indicates that comedy is a strong dislike, the program guide may use a preference level of neutral for the attribute comedy. Conflicts between the scopes selected in different profiles may be resolved, for example, by using a moderate scope for all situations in which multiple profiles are active. These techniques for allowing multiple profiles to be active at the same time are illustrative only. Any other suitable technique may be used if desired.

Figure 11:
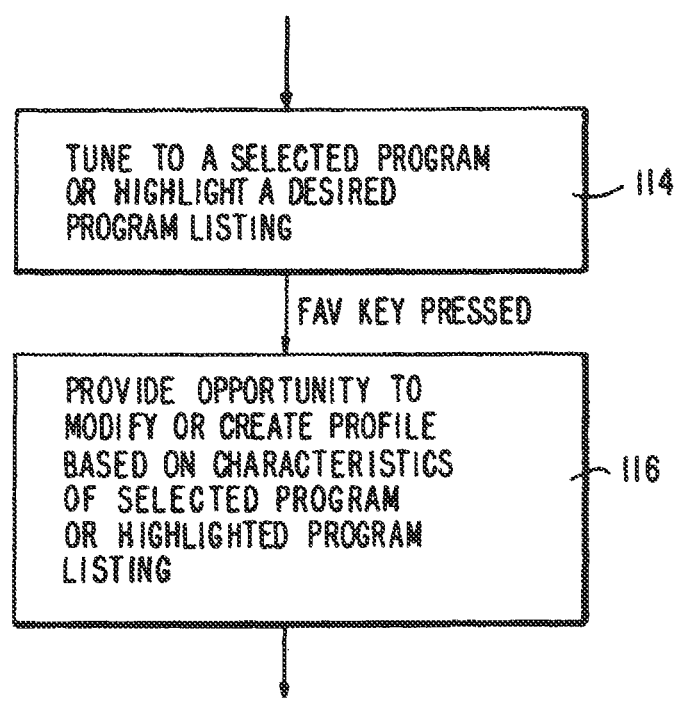
FIG. 11 is a flow chart illustrating how the program guide provides an opportunity to modify a profile based on the characteristics of a selected program in accordance with the present invention.

Preference attributes may be added to a profile by example. This is illustrated in FIG. 11. At step 114, the user may tune set-top box 44 to a channel (e.g., channel 9) to watch a desired television program (e.g., the program Seinfeld) or may highlight a desired program listing on any suitable program listings screen. The user may then press an appropriate button on the remote control (e.g., a "FAV" or favorites key) or may click on an on-screen option. The program guide then provides an opportunity to modify or create a profile based on the characteristics of the selected program or the highlighted program listing at step 116.

Figure 12:
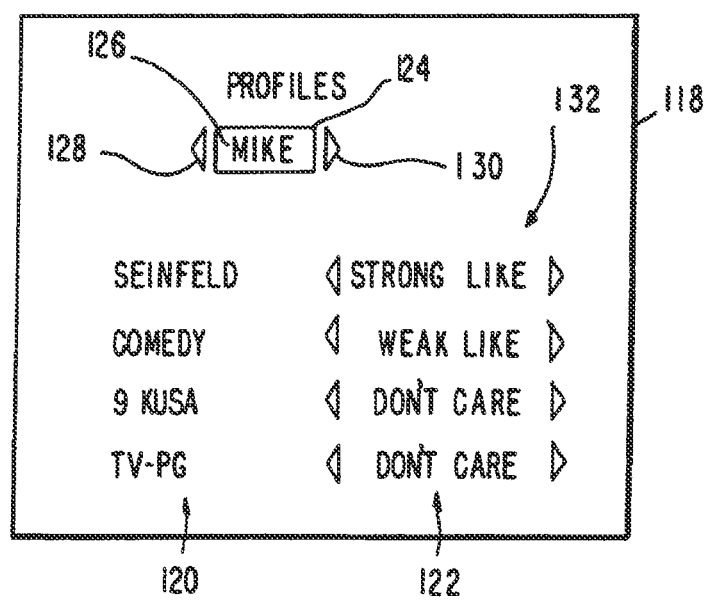
FIG. 12 is a diagram of an illustrative profiles display in accordance with the present invention.

For example, as shown in FIG. 12, the program guide may present a profiles display such as profiles display 118 in which all attributes of the selected program or highlighted program listing (Seinfeld) are listed in column 120 and the associated preference levels are listed in column 122. The user may select which profile to change or update when highlight region 124 is on a profile name 126 such as "Mike." As indicated by arrows 128 and 130, when the user presses left or right cursor keys on the remote control, the profile names for other users will be displayed under highlight region 124. By pressing a down cursor key, highlight region 124 may be moved to preference level selection region 132, where the user may use the right and left cursor keys to set the desired preference level (e.g., strong or weak like or dislike, don't care or neutral, illegal, or mandatory) for the program Seinfeld. The preference levels in column 122 may be modified similarly for each of the other attributes listed in column 120. The neutral preference level "don't care" may be set as a default. If desired, a previously selected attribute may be deselected from the profile. A new profile may be created by copying an existing profile and modifying its contents.

Figure 13:
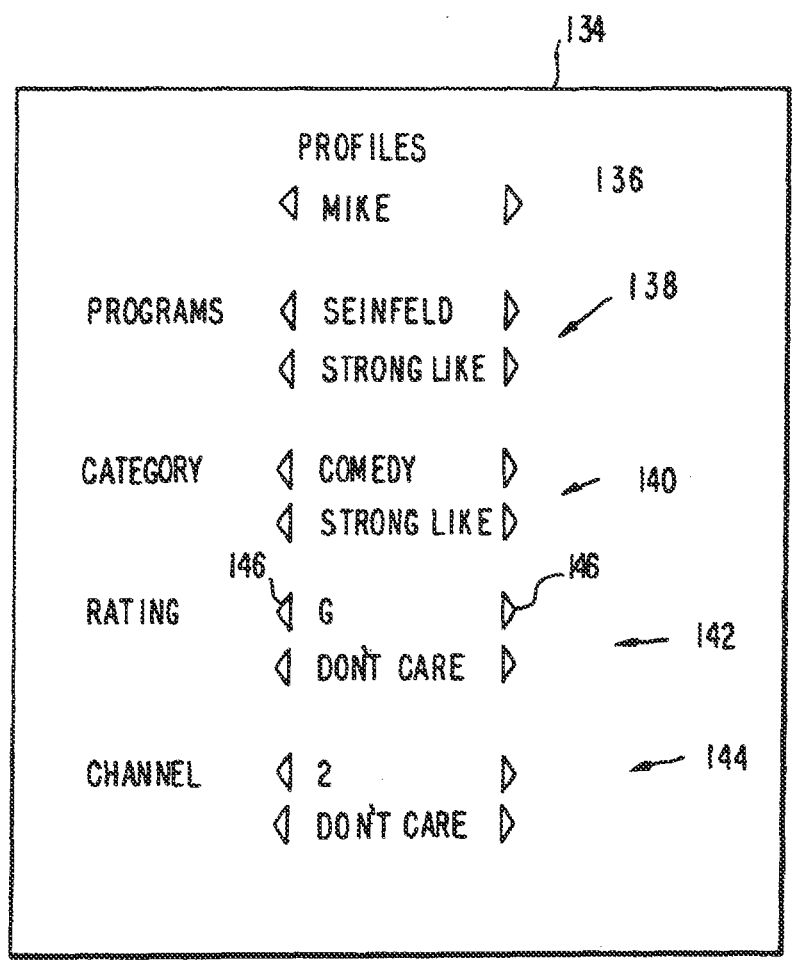
FIG. 13 is a diagram of another illustrative profiles display in accordance with the present invention.

Another way in which profiles may be modified is shown in FIG. 13. Profiles display 134 of FIG. 13 allows the user to view all selected attributes for a given profile. The program guide provides option 136 to allow the user to select which profile the user wishes to modify (e.g., "Mike" in the example of FIG. 13). Option 138 allows the user to set preference levels for various programs. Option 140 allows the user to set preference levels for various categories. Option 142 allows the user to set preference levels for various ratings. Option 144 allows the user to set preference levels for various channels. The options shown in profiles display 134 are illustrative only. Options may for provided for setting the preference levels of any desired preference attributes. The format of the options shown in FIG. 13 is also only illustrative.

Other user interfaces may be used by the program guide if desired. For example, it may be preferable to select ratings from a list (i.e., using arrows 146 in option 142 to select from among various available ratings choices). In option 138, the program guide may allow the user to enter the first few characters of a desired title. The program guide may then present a list of available titles that start with those letters. When the list has been narrowed sufficiently, the user may select the desired program title from the list. The program guide may allow text to be entered letter by letter using the cursor keys on the remote to change each letter, using a wireless keyboard, using the numeric keys on the remote to enter letters corresponding to a telephone keypad, etc. If desired, the program guide may allow users to remove attributes from the profile being modified using profiles display 134.

Figure 14:
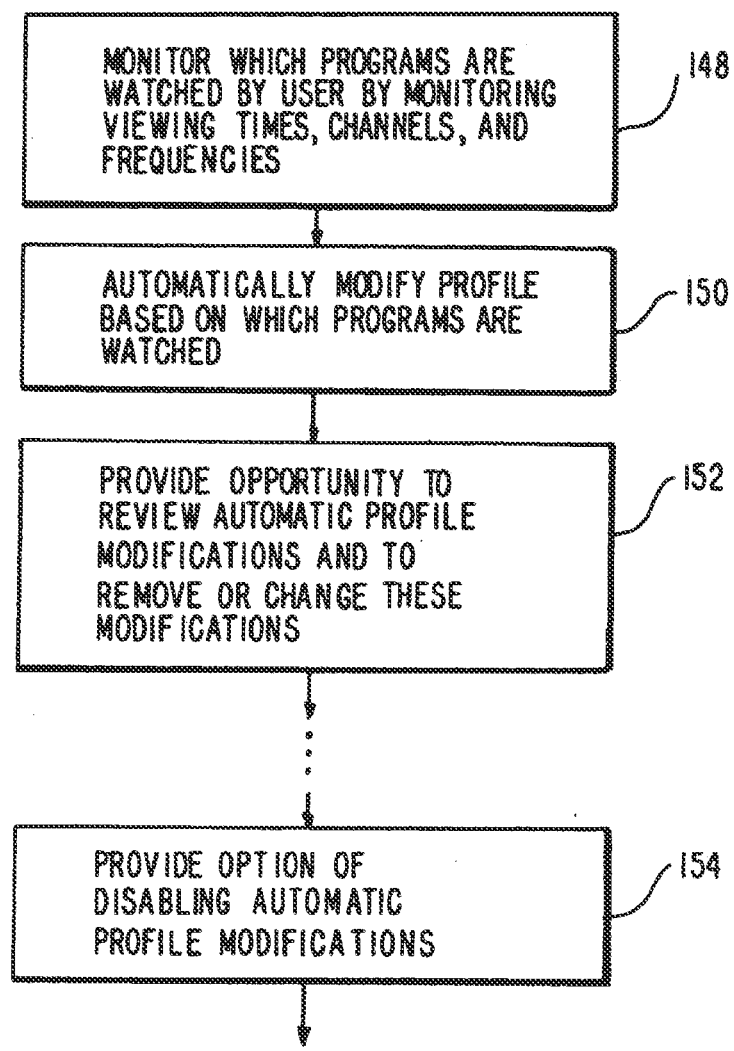
FIG. 14 is a flow chart of steps involved in automatically modifying a profile based on which programs a user watches in accordance with the present invention.

As shown in FIG. 14, the program guide may monitor the programs that are being watched by the user by monitoring the user's viewing times, channels, and the frequency with which the programs are watched (step 148). Monitoring the user's behavior in this way allows the program guide to determine the user's preferences. The program guide may modify the currently active profile based on the programs that are watched at step 150. At step 152, the program guide provides the user with an opportunity to review the automatic profile modifications and to remove or change these modifications. The program guide may also provide the user with the option of disabling the automatic profile modification feature at step 154.

Figure 15:
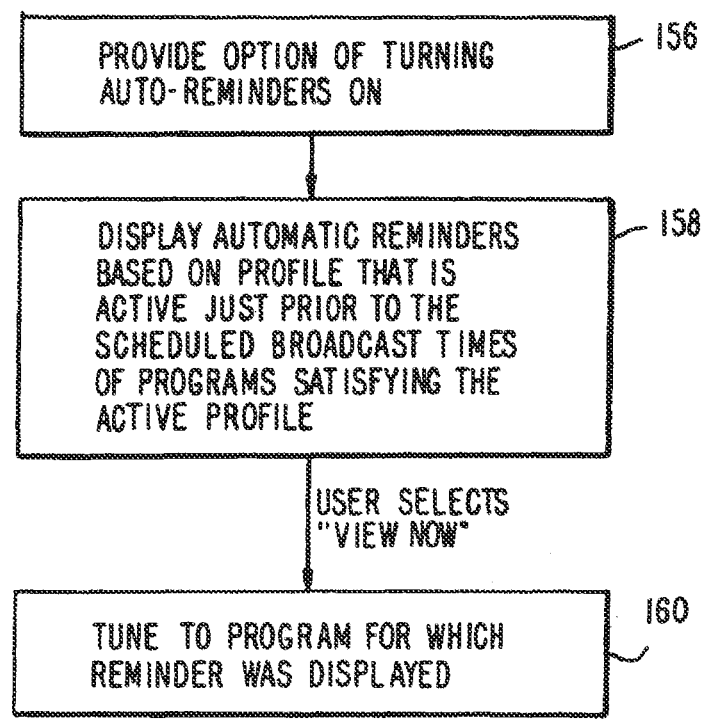
FIG. 15 is a flow chart of steps involved in using automatic reminders based on a preference profile in accordance with the present invention.

If desired, the user may direct the program guide to generate automatic program reminders for programs that satisfy the criteria in a profile. As shown in FIG. 15, the program guide may provide the option of turning on such an automatic reminders feature at step 156. If the user turns this feature on at step 156, the program guide displays automatic reminder messages on television 48 of FIG. 1 (based on the profile that is currently active) just prior to (e.g., one minute before) the scheduled broadcast times of the programs that satisfy the criteria in the profile (step 158). The program guide may present a "view now" option as part of the reminders screen used to present a reminder to the user. If the user selects the "view now" option, the program guide may tune set-top box 44 to the channel for the program for which the reminder was displayed (step 160).

Figure 16:
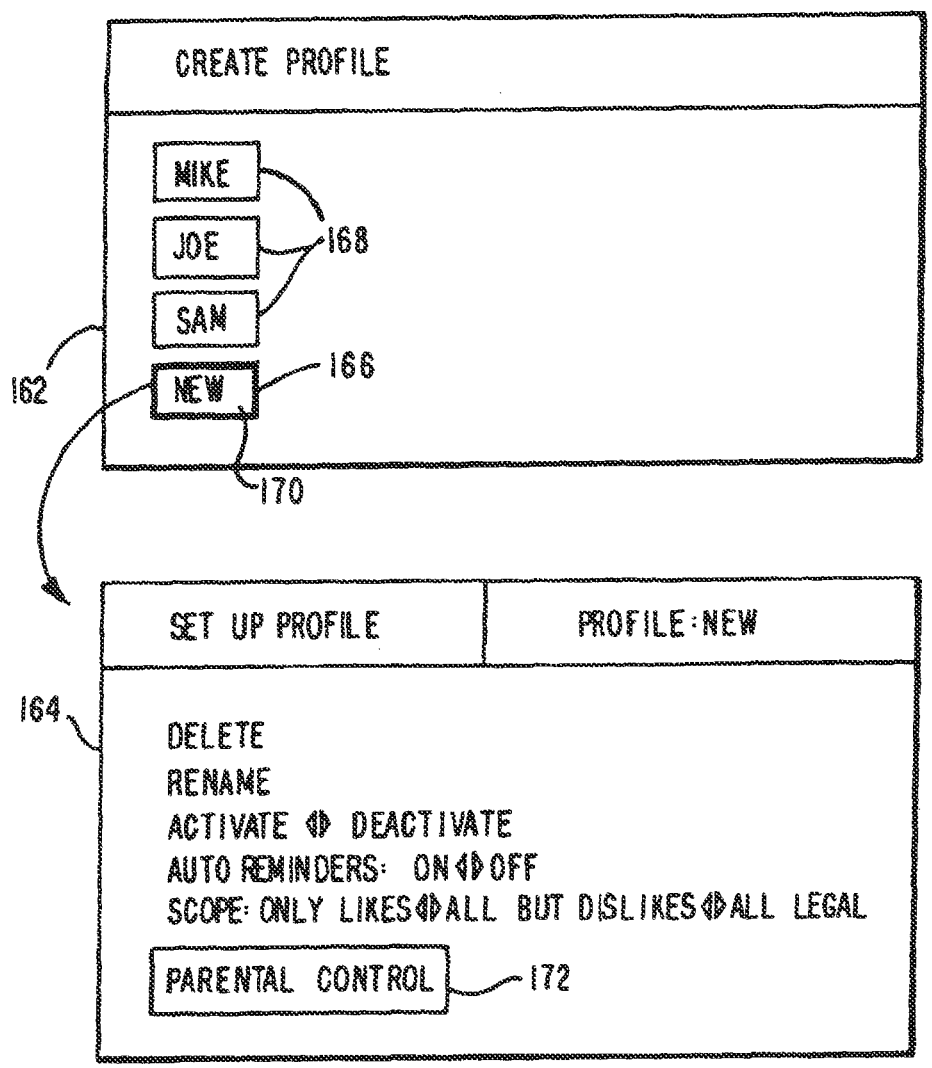
FIG. 16 is a diagram of an illustrative create profile screen and an illustrative set up profile screen in accordance with the present invention.

The program guide may allow new profiles to be created using create profile screen 162 and set up profile screen 164 of FIG. 16. The user may move highlight region 166 between various existing profile options 168 and new profile option 170 using remote control cursor keys. If new profile option 170 is selected (e.g., by pressing "OK" on the remote control), the program guide presents set up profile screen 164. Set up profile screen 164 allows the user to delete profiles, rename profiles, activate or deactivate a profile, turn the automatic reminders feature on or off, adjust the preference scope for the profile, and to adjust parental control settings. Highlight region 172 may be used to select between these various options. Parental control features that may be provided by the program guide include personal identification number (PIN) features such as activating or deactivating a PIN for a profile, selecting whether changes to preference levels requires a PIN, etc.

The preference criteria selected by a user (e.g., in the form of a preference profile) may be used by the program guide in a number of ways. For example, the program guide may use the preference criteria in a profile to restrict the number of program listings that are presented to the user, regardless of what type of display format the user has chosen to view (e.g., a by-time listing format, a by-channel listing, etc.). This approach may also be used by the program guide to restrict the channels or programs to which the user may tune (either directly or when tuning using a special program guide feature such as a browse feature or a flip feature). Alternatively, the program guide may only use the user's preferences to provide a special "favorites" program list. Another possibility is that the program guide use the preferences in all modes, but only to restrict the movement of the highlight region on the screen, not to eliminate program listings from the user's view.

Figure 17:
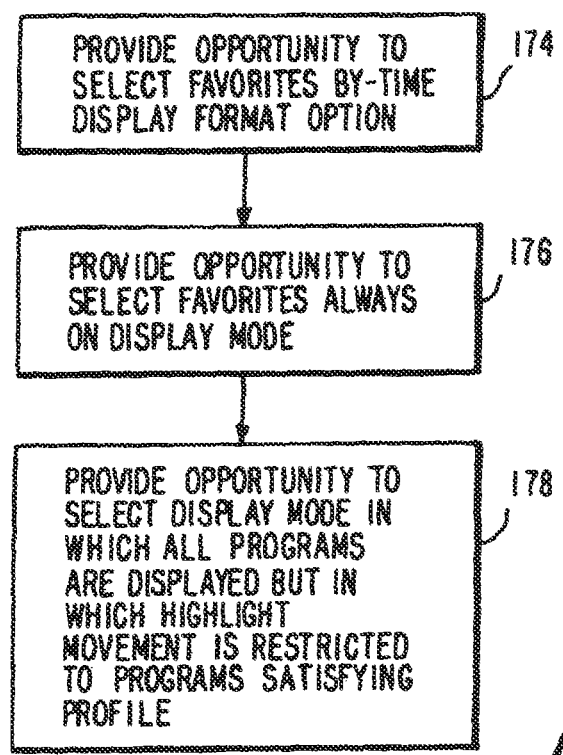
FIG. 17 is a flow chart of steps involved in providing various display mode options in accordance with the present invention.

As shown in FIG. 17, the program guide may provide the user with an opportunity to select a dedicated favorites display format option at step 174. The dedicated favorites display format may be, e.g., a time-ordered list of programs that meet the criteria set forth in the currently active profile. At step 176, the program guide may provide the user with an opportunity to select the favorites always-on display mode in which all display formats and tuning modes are restricted to the programs and channels that satisfy the user's preferences. At step 178, the program guide provides the user with the opportunity to select a display mode in which all programs are displayed, but in which highlight movement is restricted to programs satisfying the user's preferences in the active profile. Alternatively, the display format may be fixed by the program guide and the user not provided with options 174, 176, or 178.

Figure 18:
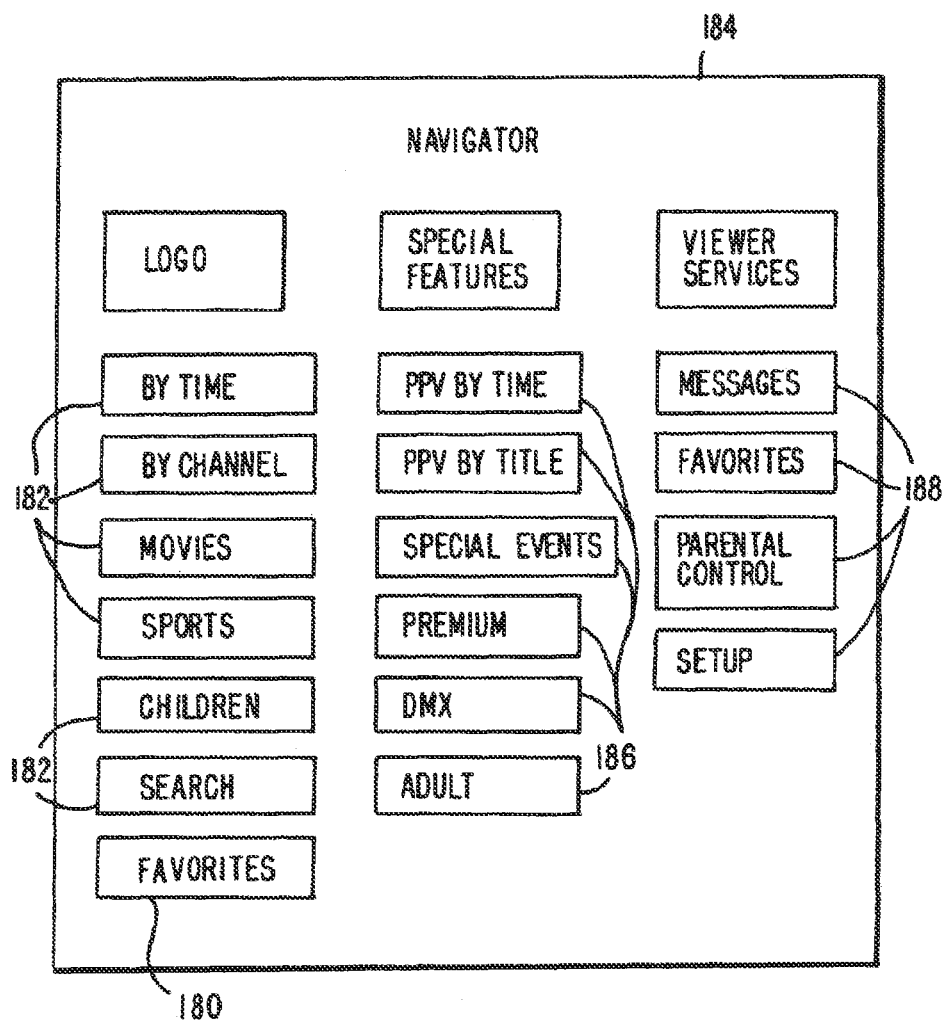
FIG. 18 is an illustrative navigator menu containing a favorites display mode option in accordance with the present invention.

An illustrative arrangement for providing the dedicated favorites display format option is shown in FIG. 18. In the FIG. 18 arrangement, dedicated favorites option 180 is offered as a clickable option at the bottom of a column of display format options 182 in a navigator menu 184. Other options available in navigator menu 184 include special features options 186 (listing of pay-per-view programs organized by time, by title, etc.) and viewer services options 188.

The type of program listings display that may be provided by the program guide when option 180 is selected is shown in FIG. 19 (i.e., following step 174 of FIG. 17). By-time favorites list 190 contains all programs that satisfy the preferences set forth in the current profile organized in a time-ordered list. The user may select another profile using left and right cursors when highlight region 192 is on profile name region 194. The user may modify the current preference scope using scope option 196.

When the user selects the always-on mode option provided at step 176 of FIG. 17, all of the program listings display formats such as those invoked by options 182 of FIG. 18 are modified to display only those programs that satisfy the user's preferences. For example, selecting by-time option 182 when the always-on mode has been selected results in a by-time favorites display of the type shown in FIG. 19.

Figure 20:
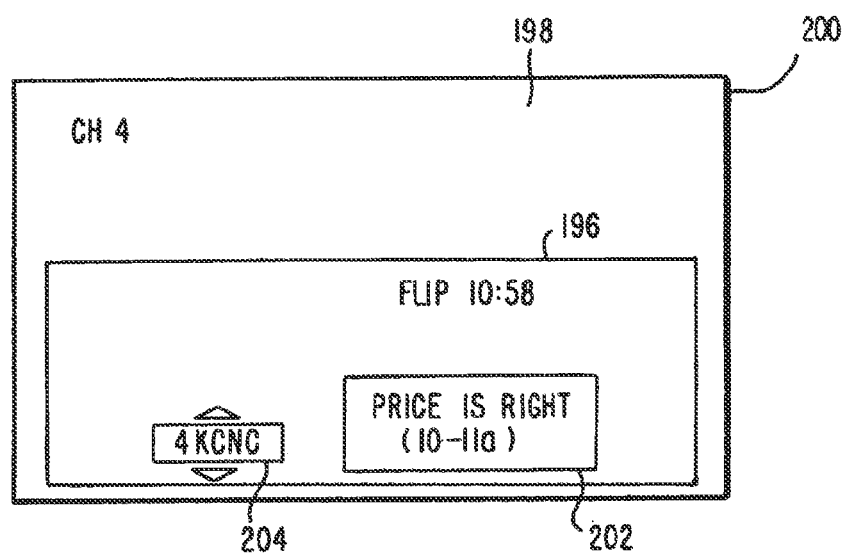
FIG. 20 is a diagram of an illustrative flip feature for the program guide in accordance with the present invention.

In addition, the programs and channels to which the program guide allows the user to tune with set-top box 44 (FIG. 1) are restricted to the programs and channels that satisfy the user's preferences when the always-on mode has been selected. The programs and channels to which the user may tune are also restricted when the user is using special tuning features. For example, the program guide may provide a special "flip" tuning feature. As shown in FIG. 20, when the user invokes the flip mode, flip display 196 is provided over a portion of a channel 198 (i.e., channel 4 ) that the user is currently tuned to and is watching on display screen 200. Flip display 196 contains information on programs 202 appearing on channel 204. Channel 204 is the same channel (channel 4 ) as the channel 198 (channel 4 ) to which the set-top box 44 is currently tuned. The user may change channel 204, e.g., using channel up and down keys on the remote control, which also changes the channel 198. When the always-on mode has been selected, the channels to which the user may flip are generally restricted to the channels 204 containing programs 202 that satisfy the user's preferences. If desired, the user may be provided with access to any channel, e.g., by allowing the user to enter channel numbers directly.

Figure 21:
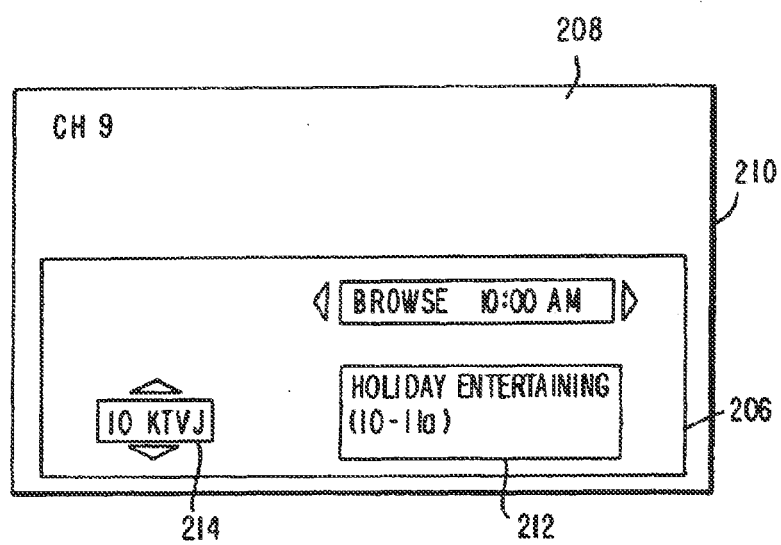
FIG. 21 is a diagram of an illustrative browse feature for the program guide in accordance with the present invention.

As shown in FIG. 21, when the user invokes the browse mode, browse display 206 is provided over a portion of a channel 208 (i.e., channel 9) which the user is currently tuned to and is watching on display screen 210. Browse display 206 contains information on programs 212 appearing on different channels 214. The user may change channels 214 using up and down cursor keys without changing channel 208. When the always-on mode has been selected, the channels 214 which the user may browse to are generally restricted to the channels 214 containing programs 212 that satisfy the user's preferences. If desired, the user may be provided with access to any channel, e.g., by allowing the user to enter channel numbers directly.

The restricted highlight movement mode option provided at step 178 of FIG. 17 may be used when the user is viewing a program listings screen such as screen 216 of FIG. 22 by pressing a key such as the favorites key to move highlight region 218 from one program that satisfies the user's preferences (e.g., Dante's Peak) to the next program that satisfies the user's preferences (e.g., ER). The user may be provided with access to all displayed programming (e.g., by allowing the user to press regular up and down cursors to access programs that do not satisfy the user's preferences).

If desired, the favorites key may be used in the flip and browse modes to advance to the next program satisfying the active profile.

Figure 23:
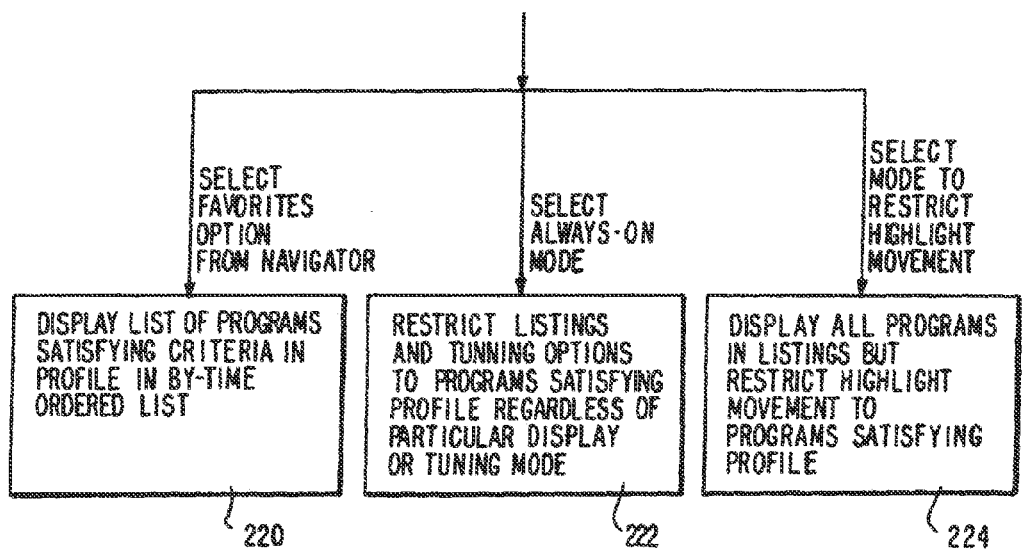
FIG. 23 is a flow chart of steps involved displaying programs in various display modes in accordance with the present invention.

FIG. 23 is a flow chart illustrating steps performed by the program guide for each of the FIG. 17 options that may be selected by the user. If option 174 of FIG. 17 is selected, the program guide displays a list of programs that satisfy the criteria in the user's profile in a dedicated favorites by-time ordered list at step 220. If option 176 of FIG. 17 is selected, the program guide restricts the listings and tuning options provided to the user to those programs that satisfy the user's profile, regardless of the particular display mode (e.g., by-time, by-channel, etc.) or tuning mode (e.g., browse, flip, etc.) of the guide at step 222. If option 178 of FIG. 17 is selected, the program guide displays all programs in the desired listings format selected by the user, but restricts highlight movement within those listings to programs that satisfy the user's preferences at step 224.

To accommodate multiple active profiles, the program guide may list programs using different colors, patterns, icons, etc. to distinguish which programs satisfy which profiles. For example, in the by-time listings display of FIG. 24, the programs Seinfeld, Dante's Peak, and ER satisfy the preference criteria in Mike's profile, as indicated by the "M" icons and the use of the red color and first distinct pattern for the cells of the grid for those listings. The programs ER and Football satisfy the preferences in John's profile, as indicated by the "J" icons and the use of the green color and second distinct pattern for the cells of the grid for those listings. The ER cell contains two colors, two patterns, and two icons indicating that the program ER satisfies the criteria in both Mike's profile and John's profile. Icons, color-coding, and patterns are merely illustrative examples of suitable visual indicators for distinguishing which programs satisfy which profiles. These approaches may be used in any suitable combination or any other suitable approach may be used to distinguish the results satisfying different profiles.

Figure 25:
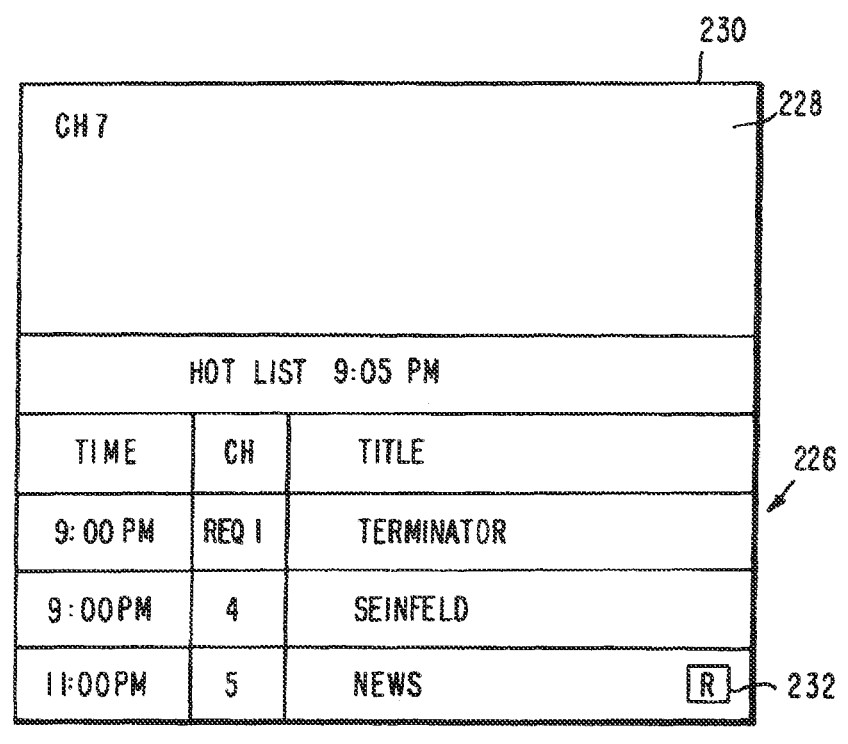

As shown in FIG. 25, a hot list 226 may be provided that contains programs that match the attributes of the active profile. Hot list 226 may be displayed on top of the channel 228 (e.g., channel 7) on display 230 to which the user is currently tuned. The program guide may allow the user to display hot list 226 by pressing a single key on the remote control (e.g., an "OK" key) while watching television. Any programs for which active (non-expired) reminders have been set may be added to the hot list. In the example of FIG. 25, a reminder was set for the 11:00 news, as indicated by reminder icon 232, so the 11:00 news was included in hot list 226. Hot list 226 may be organized in start-time order or any other suitable order. Priority may be given to pay-per-view listings. For example, the program Terminator appears before the program Seinfeld in the hot list arrangement of FIG. 25, because the program Terminator appears on a pay-per-view channel (REQ 1).

Figure 26:
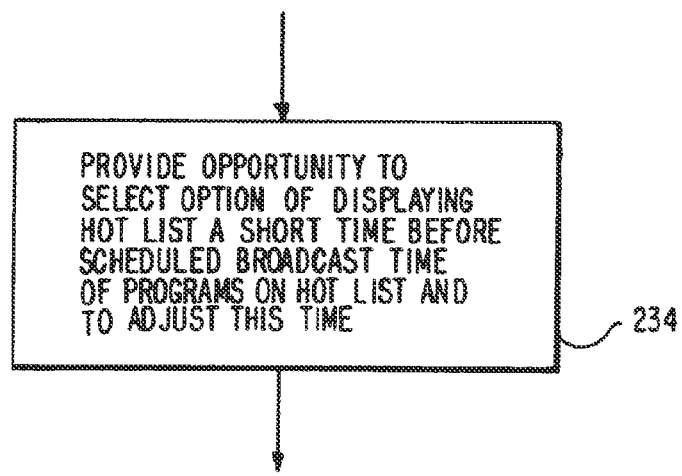
FIG. 26 is a flow chart of the step of providing the option of displaying a hot list a short time before the start time of the programs on the hot list in accordance with the present invention.

After hot list 226 is displayed, the program guide may allow the user to remove hot list 226 by pressing a single key. The program guide also allows the user to select any of the displayed programs in the list (e.g., using a highlight region) and tunes set-top box to the appropriate channel for the selected program. When there are more programs that satisfy the user's preference profile criteria than will fit on the lower portion of the display, the program guide may allow the user to scroll through the hot list entries. The program guide may remove programs from hot list 226 when they are no longer viewable. Programs may be added to hot list 226 by the program guide when the programs start, or at a specified length of time (e.g., five minutes) prior to the scheduled start time of the program. The program guide may provide the user with an opportunity to select the option of displaying the hot list a short time (e.g., one minute) before the scheduled broadcast time of programs on the list and to adjust this length of time at step 234 of FIG. 26.

Figure 27:
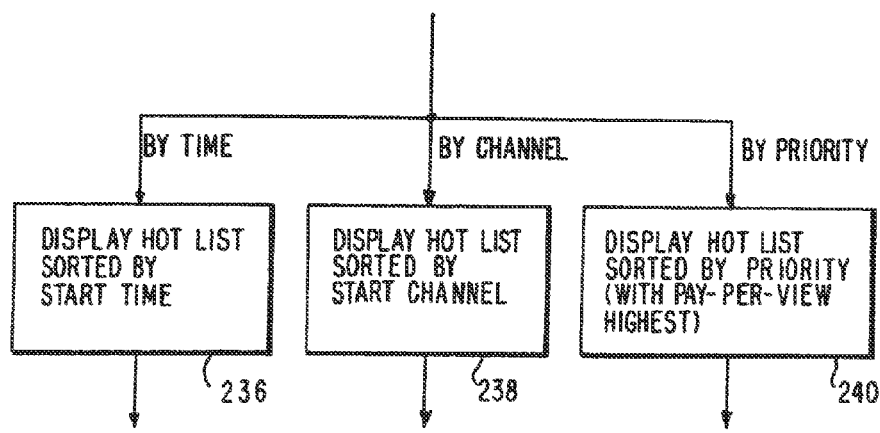
FIG. 27 is a flow chart of steps involved in displaying a hot list in various formats in accordance with the present invention.

If the user chooses to display the hot list sorted by start time, the program guide displays the list in this fashion at step 236 of FIG. 27. If the user chooses to display the hot list sorted by channel, the program guide displays a channel-ordered hot list at step 238. If the user chooses to display the hot list sorted by priority (e.g., with pay-per-view programs listed first), the program guide displays this type of listing at step 240.

Any profile may be assigned a PIN. As shown in FIG. 28, the program guide may provide a personal identification number setup screen 242 that contains a number of user-selectable options regarding PIN usage. For example, PIN setup screen 242 provides an option 244 that allows the user to indicate which profile is being modified. If a PIN has already been established for that profile, the user may be required to enter that PIN at option 246 to continue. If no PIN exists, option 246 may be used to create a new PIN.

Option 248 allows the user to specify whether the PIN is required to activate the profile (e.g., to activate the profile for Joey in the example of FIG. 28). Option 250 allows the user to specify whether the PIN is required for deactivating the profile. Option 252 allows the user to specify whether the PIN is required for viewing profile attributes. Option 254 allows the user to specify whether the PIN is required for adding, deleting, or changing illegal attributes. Option 256 allows the user to specify whether the PIN is required for adding deleting or changing mandatory attributes. Option 258 allows the user to specify whether the PIN is required for adding deleting, or changing likes and dislikes. The options shown in setup screen 242 are illustrative only. For example, if other preference levels are used, options regarding PIN usage for those levels may be provided using screen 242. Any other suitable arrangement may be used by the program guide to allow the user to adjust PIN control levels, if desired.

The arrangement of FIG. 28 allows the user to use PIN controlled profiles for parental control. For example, a parent can set up a child's profile with a restrictive set of preference attributes (e.g., with a mandatory G rating and a preference level of illegal associated with the genre cartoons). By requiring that a PIN be used to deactivate the profile or to change the preference level attributes, the parent can ensure that the child will only be able to watch G-rated programming and no cartoons when the child's profile is active. A different profile may be created for use when the child's viewing is being closely supervised.

Particularly in situations in which parents wish to set limits on the viewing of their children, it may be desirable to use a master profile that contains settings that override the settings in all other profiles. As shown in FIG. 29, such a master profile may contain illegal preference attributes (e.g., illegal ratings) and mandatory preference attributes. The master profile may also contain other preference settings (e.g., with various preference levels of like, dislike, etc.) The illegal and mandatory attributes of the master profile are controlling. Accordingly, even if profile Joey contains a mandatory R rating setting, the illegal R rating setting in the master profile of FIG. 29 dictates that no R rated programs will be allowed. Similarly, the mandatory English setting in the master profile dictates that English is a required attribute, regardless of the language setting in other profiles. Conflicts between the master profile and other profiles with respect to attributes other than mandatory and illegal attributes may also be resolved in favor of the master profile if desired.

Figure 30:
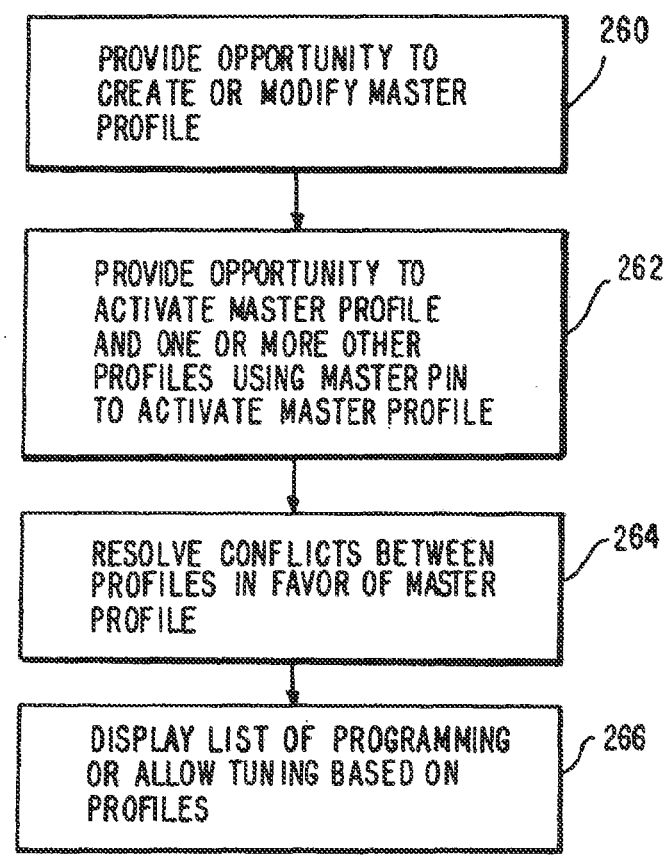
FIG. 30 is a flow chart of illustrative steps involved in using a master profile in accordance with the present invention.

Steps involved in using master profiles are shown in FIG. 30. At step 260, the program guide provides the user with an opportunity to create or modify a master profile. Step 260 typically involves setting up a master PIN that may be used for parental control. At step 262, the program guide may provide the user with an opportunity to activate the master profile. One or more other profile may also be activated at step 262. Typically, the master PIN is used to activate the master profile. Because the master PIN is generally not known by children, the master PIN provides parents with global control over programming. If desired, once the master PIN has been set up in the system, entering the master PIN may allow the user to modify the profiles of their children.

As step 264, the program guide resolves conflicts between the preference criteria in the various profiles in favor of the master profile. After (or at the same time) such conflicts are resolved, the program guide may display a list of programming or allow tuning to certain channels based on the criteria in the active profiles at step 266.

If desired, the program guide may provide an opportunity for the user to select whether the program titles, descriptions, etc. for programs that do not satisfy a given preference profile should be hidden from view. This feature is useful in situations in which a parent not only wishes to restrict the viewing options of a child, but also wishes to prevent the child from being able to view information on programming that does not satisfy a given profile (e.g., the master profile). When the user directs the program guide to block the titles and descriptions for programs that do not satisfy the profile, the program guide may display a message such as "restricted" on various program guide display screens in place of the program listings for the blocked programs. The option of replacing non-favorite program listings with a "restricted" message may be placed under master PIN control.

Another feature provided by the program guide relates to profile settings for non-program items. For example, a profile setting may be used to define various audio settings 268 for user television equipment 40 (stereo, mono, Dolby on/off, bass and treble settings, etc.), as shown in FIG. 31. Display settings 270 such as brightness, contrast, the language of the text displayed in the program guide, etc. may also be associated with a given profile (e.g., the profile "Mike"). Audio settings 268 and display settings 270 are examples of non-program settings that may be associated with a profile. If desired, other suitable non-program settings may also be associated with a profile.

Figure 32:
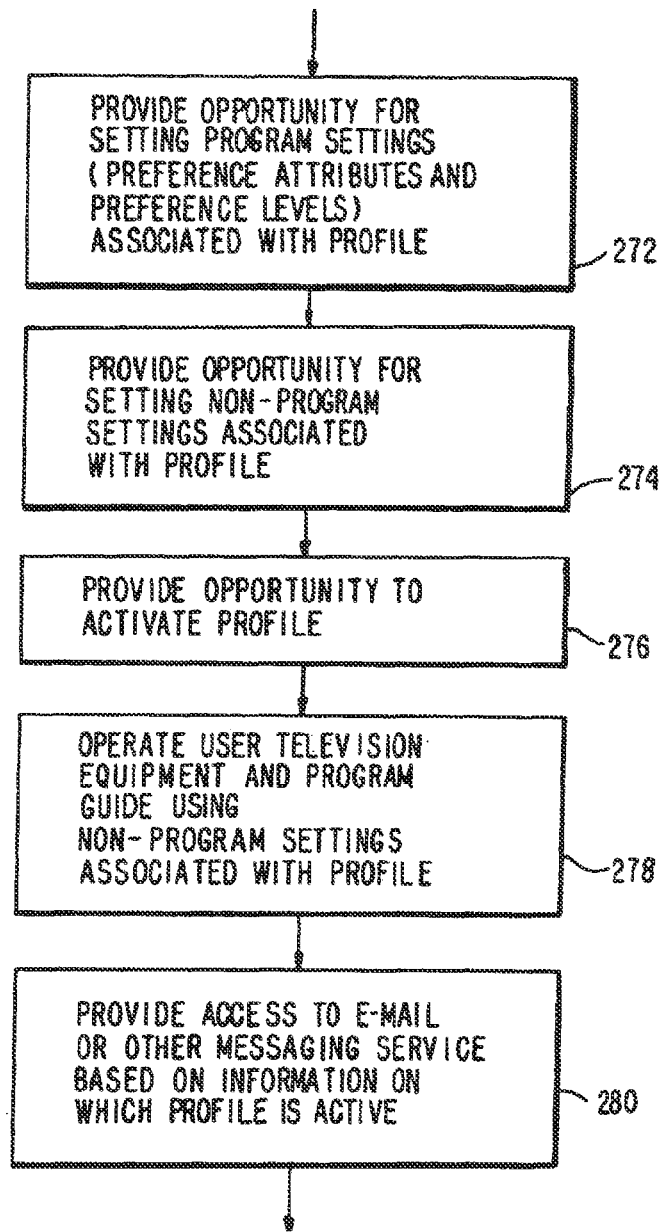
FIG. 32 is a flow chart of illustrative steps involved in using a preference profile to specify certain non-program settings in accordance with the present invention.

As shown in FIG. 32, the program guide may provide the user with an opportunity for setting program settings (preference attributes, preference levels, preference scope, etc.) for a given profile at step 272. At step 274, the program guide may provide the user with an opportunity to set non-program settings associated with that profile. At step 276, the program guide may provide an opportunity to activate the profile. At step 278, the user television equipment and the program guide are operated using the non-program settings.

Because the program guide knows which profile is active (e.g., Mike or Joey, etc.) at a given time, the program guide may use this information in providing various services. For example, the program guide may provide access to a program guide e-mail service or other messaging service using information about which profile is currently active (step 280). This allows a user to access e-mail, for example, without having to separately log into the e-mail service. If Mike's profile is currently active, the program guide can retrieve messages addressed to Mike. If Joey's profile is active, the program guide can provide access to Joey's messages. If more than one profile is active, the program guide can provide access to the messaging service to the users of all active profiles or may require that each user log in separately.

The foregoing is merely illustrative of the principles of this invention and various modifications can be made by those skilled in the art without departing from the scope and spirit of the invention.

What is claimed is:

1. A method for using a media guidance application, the method comprising:
   automatically selecting, using circuitry, media assets for display based on a stored first user profile associated with a first user;
   arranging, using the circuitry, representations of the selected media assets in a sequence;
   causing, using the circuitry, the representation of the media assets to be displayed in the arranged sequence; and
   visually distinguishing, using the circuitry, a first representation of a first media asset from a second representation of a second media asset based on whether the first representation corresponds to a second user profile associated with a second user that is different from the stored first user profile, wherein the first representation and the second representation are simultaneously displayed.

2. The method of claim 1, further comprising:
   storing, using the circuitry, the first user profile that is indicative of the first user's media asset interests; and
   wherein causing the representations of media assets to be displayed comprises generating a list of the selected media assets for display.

3. The method of claim 2, wherein the visually distinguishing further comprises:
   indicating, using the circuitry, in the generated list, media assets that satisfy the second user profile.

4. The method of claim 2, further comprising:
   storing, using the circuitry, the second user profile that is indicative of the second user's media asset interests; and
   indicating, using the circuitry, in the generated list, media assets that satisfy the first user profile using a first indication, and media assets that satisfy the second preference profile using a second indication.

5. The method of claim 2, further comprising:
   generating, using the circuitry, for display a first selectable indicator of a preference attribute indicative of the first user's programming interests;
   generating, using the circuitry, for display, a second selectable indicator of a preference level for the preference attribute;
   wherein storing the first profile is based on receiving a selection of the first selectable indicator and the second selectable indicator.

6. The method of claim 1, wherein the arranged sequence is based on sources of the media assets.

7. The method of claim 1, where in the arranged sequence is based on priorities of the media assets.

8. The method of claim 1, wherein the arranged sequence is based on titles of the media assets.

9. The method of claim 1, further comprising:
   generating, using the circuitry, for display, a selectable list of preference profiles;

wherein the automatically selecting media assets is based on a selected preference profile of the selectable list of preference profiles.

10. The method of claim 1, further comprising:
generating, using the circuitry, for display, a selectable option to set a reminder for one of the selected media assets.

11. A system for using a media guidance application, the system comprising:
circuitry configured to:
automatically select media assets for display based on a stored first user profile associated with a first user;
arrange representations of the selected media assets in a sequence;
cause the representation of the media assets to be displayed in the arranged sequence; and
visually distinguish a first representation of a first media asset from a second representation of a second media asset based on whether the first representation corresponds to a second user profile associated with a second user that is different from the stored first user profile, wherein the first representation and the second representation are simultaneously displayed.

12. The system of claim 11, wherein the circuitry is further configured to:
store a first user profile that is indicative of the first user's media asset interests; and
wherein causing the representations of the media assets to be displayed comprises generating a list of the selected media assets for display.

13. The system of claim 12, wherein the circuitry is further configured to:
visually indicate the first representation by indicating in the generated list, media assets that satisfy the second user profile.

14. The system of claim 12, wherein the circuitry is further configured to:
store a second user profile that is indicative of the second user's media asset interests; and
indicate in the generated list, media assets that satisfy the first user profile using a first indication, and media assets that satisfy the second user profile using a second indication.

15. The system of claim 12, wherein the circuitry is further configured to:
generate for display a first selectable indicator of a preference attribute indicative of the first user's programming interests;
generate for display, a second selectable indicator of a preference level for the preference attribute;
wherein storing the first user profile is based on receiving a selection of the first selectable indicator and the second selectable indicator.

16. The system of claim 11, wherein the arranged sequence is based on sources of the media assets.

17. The system of claim 11, wherein the arranged sequence is based on priorities of the media assets.

18. The system of claim 11, wherein the arranged sequence is based on titles of the media assets.

19. The system of claim 11, wherein the circuitry is further configured to:
generate for display, a selectable list of preference profiles;
wherein the automatically selecting media assets is based on a selected preference profile of the selectable list of preference profiles.

20. The system of claim 11, wherein the circuitry is further configured to:
generate for display, a selectable option to set a reminder for one of the selected media assets.

* * * * *